United States Patent

Ishikura et al.

[11] Patent Number: 5,995,813
[45] Date of Patent: Nov. 30, 1999

[54] RADIO TELEPHONE AND INDEPENDENTLY CONTROLLED BOOSTER

[75] Inventors: Akira Ishikura, Tokyo; Buntaro Sawa, Sagamihara; Masatoshi Ikeda, Oume, all of Japan

[73] Assignee: Kabushiki Kaisha Toshiba, Kawasaki, Japan

[21] Appl. No.: 08/946,973

[22] Filed: Oct. 8, 1997

Related U.S. Application Data

[63] Continuation of application No. 08/495,663, filed as application No. PCT/JP94/00155, Feb. 3, 1994, abandoned.

[51] Int. Cl.⁶ .................................................. H04B 1/02
[52] U.S. Cl. ........................ 455/127; 455/69; 455/115; 455/571
[58] Field of Search ............... 455/69, 522, 571, 455/126, 127, 550, 575, 116, 13.4, 115, 117, 63, 67.11, 67.3, 572

[56] References Cited

U.S. PATENT DOCUMENTS

| | | | |
|---|---|---|---|
| 4,380,089 | 4/1983 | Weir | 455/127 |
| 4,776,034 | 10/1988 | Matsuo | 455/54.1 |
| 5,048,117 | 9/1991 | Aisaka et al. | 455/571 |
| 5,081,713 | 1/1992 | Miyazaki | 455/116 |
| 5,109,541 | 4/1992 | Park | 455/571 |
| 5,146,614 | 9/1992 | Furuno | 455/127 |
| 5,276,918 | 1/1994 | Cornforth et al. | 455/127 |
| 5,444,867 | 8/1995 | Marui et al. | 455/127 |
| 5,450,620 | 9/1995 | Vaisanen | 455/571 |
| 5,457,814 | 10/1995 | Myrskog et al. | 455/571 |
| 5,524,044 | 6/1996 | Takeda | 455/571 |

FOREIGN PATENT DOCUMENTS

| | | |
|---|---|---|
| 60-116239 | 6/1985 | Japan . |
| 61-121537 | 6/1986 | Japan . |
| 2-20763 | 8/1990 | Japan . |
| 2-268022 | 11/1990 | Japan . |
| 3-109829 | 5/1991 | Japan . |
| 3-270421 | 12/1991 | Japan . |

*Primary Examiner*—Reinhard J. Eisenzopf
*Assistant Examiner*—Lester G. Kincaid
*Attorney, Agent, or Firm*—Banner & Witcoff, Ltd.

[57] ABSTRACT

In a radio telephone equipment which includes a portable radiotelephone (100) and a booster (400), an output from the portable radiotelephone (100) whose output level is set according to a level control signal transmitted from a base station is amplified with a preset amplification factor by an automatic gain control circuit (22) provided in the booster (400). As a result, since the amplification factor of the amplifier in the booster and the portable radiotelephone are independently controlled, the booster can be connected to even a portable radiotelephone which is designed without considering that it will be connected to the booster.

25 Claims, 23 Drawing Sheets

| LEVEL CONTROL SIGNAL FROM BASE STATION | OUTPUT LEVEL WHEN RADIO-TELEPHONE IS USED SIGNAL | ADAPTER OUTPUT LEVEL WHEN BOOSTER IS CONNECTED | BOOSTER OUTPUT LEVEL WHEN BOOSTER IS CONNECTED |
|---|---|---|---|
| PL0 | PL2 | PL2 | PL0 |
| PL1 | PL2 | PL3 | PL1 |
| PL2 | PL2 | PL4 | PL2 |
| PL3 | PL3 | PL5 | PL3 |
| PL4 | PL4 | PL6 | PL4 |
| PL5 | PL5 | PL7 | PL5 |
| PL6 | PL6 | PL8 | PL6 |
| PL7 | PL7 | PL9 | PL7 |

FIG. 5

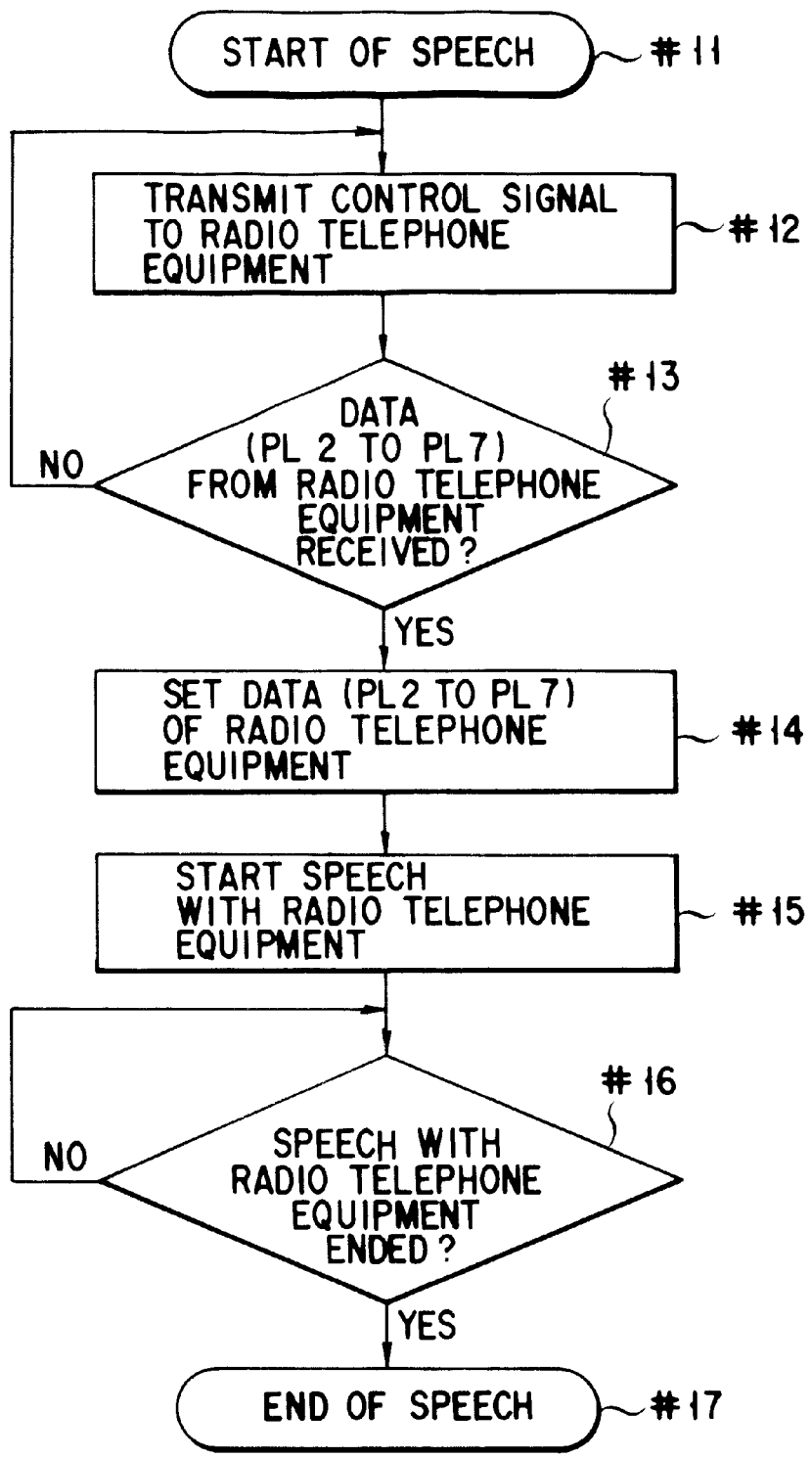
F I G. 16

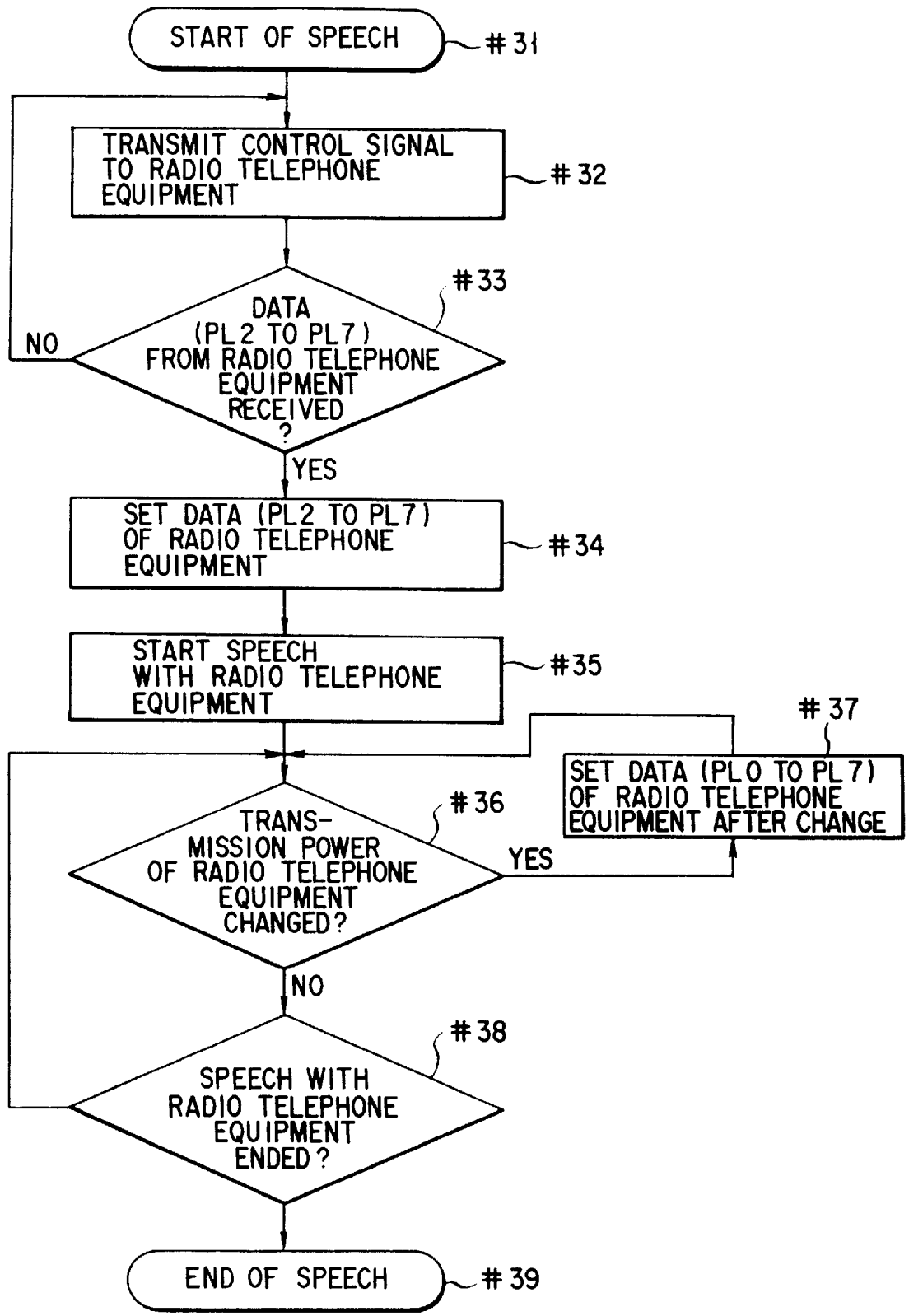
F I G. 18

RADIO TELEPHONE AND INDEPENDENTLY CONTROLLED BOOSTER

This application is a continuation of application Ser. No. 08/495,663, filed Jul. 27, 1995, now abandoned.

TECHNICAL FIELD

This invention relates to a radio telephone equipment, and more particularly to a radio telephone equipment using a booster.

BACKGROUND ART

FIG. 1 is a block diagram showing a conventional radio telephone equipment having a booster capable of amplifying transmission power. In the radio telephone equipment, a portable radiotelephone 900 is connected to a booster 909 via a high-frequency signal line 914. The portable radiotelephone 900 is constructed by a signal source 904, amplifier 902, attached antenna 901 for transmitting an output of the amplifier 902, switching circuit 903, automatic gain control circuit 905 and control circuit 906. The booster 909 is constructed by an amplifier 910 and automatic gain control circuit 913. An output signal from the booster 909 is transmitted from an external antenna 912.

The operation of the radio telephone equipment of FIG. 1 is explained according to the switching state of the switching circuit 903.

First, a case wherein the switching circuit 903 connects the amplifier 902 of the radiotelephone 900 to An output signal of the amplifier 902 is transmitted via the switching circuit 903 and attached antenna 901 and the booster 909 is not used. In this state, the switching circuit 903 outputs a detection signal of high logical level to the control circuit 906. The control circuit 906 transmits the detection signal of high logical level to the automatic gain control circuit 905. The automatic gain control circuit 905 controls the amplification factor of the amplifier 902 based on part (feedback signal) of an output of the amplifier 902 and a level control signal from the control circuit 906 in response to the detection signal of high logical level.

Next, a case wherein the radiotelephone 900 is connected to the booster 909 and the switching circuit 903 of the booster connects the amplifier 902 of the radiotelephone 900 to the booster 909 is explained. In this case, an output signal of the amplifier 902 is transmitted via the switching circuit 903, high-frequency signal line 914, amplifier 910 and external antenna 912. In this state, the switching circuit 903 outputs a detection signal of low logical level to the control circuit 906. The control circuit 906, in response to the detection signal of low level, supplies a level control signal corresponding to a position of the radio telephone equipment in the zone and transmitted from a base station which is not shown to the automatic power control circuit 913 and supplies the detection signal to the automatic gain control circuit 905. The automatic gain control circuit 905 controls the amplification factor of the amplifier 902 to keep an output level of the amplifier 902 constant irrespective of the level control signal in response to the detection signal of low logical level. The automatic gain control circuit 913 controls the amplification factor of the amplifier 910 based on part (feedback signal) of an output of the amplifier 910 and the level control signal from the control circuit 906.

In the above conventional radio telephone equipment, since the amplification factor of the amplifier 910 of the booster 909 is set based on the level control signal transmitted from the base station at the time of connection of the booster, the booster 909 can be connected only to the portable radiotelephone 900 of a type having the control circuit 906 for outputting a level control signal. That is, only the portable radiotelephone 900 which is designed by taking connection thereof to the booster 909 into consideration can be connected to the booster 909. Thus, conventionally, a problem that a combination of the connectable booster and the type of the portable radiotelephone is limited occurs.

A first object of this invention is to provide a radio telephone equipment which includes a portable radiotelephone and a booster and which can stably amplify an output even when any type of portable radiotelephone and a booster are combined.

A second object of this invention is to provide a booster which can be connected to any type of portable radiotelephone.

Disclosure of the Invention

According to this invention, in a radio telephone equipment which comprises a radiotelephone and a booster removably connected to the radiotelephone and communicates with a base station via a radio circuit;

the radiotelephone includes:

means for generating a control signal and speech signal to be transmitted;

an antenna for transmitting a signal;

first amplifying means for amplifying the signals generated from the generating means;

first automatic gain control means for controlling the amplification factor of the first amplifying means according to an output level of the first amplifying means and a control signal from the base station; and switching means for selectively supplying an output signal of the first amplifying means to the antenna of the radiotelephone or the booster; and the booster includes:

second amplifying means for amplifying a signal supplied from the first amplifying means; and second automatic gain control means for controlling the amplification factor of the second amplifying means according to an input level of the second amplifying means and an output level of the second amplifying means.

According to this invention, a booster device removably connected to a radiotelephone and connected to a base station via a radio circuit includes:

means for amplifying a transmission signal output from the radiotelephone;

means for determining the presence or absence of the transmission signal based on the level of an input signal of the amplifying means; and means for supplying electric power to the amplifying means at least when the determining means determines that the transmission signal is present.

According to this invention, in a radio telephone equipment which comprises a radiotelephone and a booster removably connected to the radiotelephone and communicates with a base station via a radio circuit;

the radiotelephone includes:

means for generating a control signal and speech signal to be transmitted;

an antenna for transmitting a signal;

first amplifying means for amplifying the signals generated from the generating means;

first automatic gain control means for controlling the amplification factor of the first amplifying means according to a channel specifying signal supplied from the exterior; and switching means for selectively supplying an output signal of the first amplifying means to the antenna of the radiotelephone or the booster; and the booster includes:

second amplifying means for amplifying a signal supplied from the first amplifying means; and second automatic gain control means for controlling the amplification factor of the second amplifying means according to an input level of the second amplifying means and an output level of the second amplifying means.

According to this invention, the radio telephone equipment which communicates with the base station via the radio circuit includes:

means for receiving a control signal transmitted from the base station at the time of starting of speech;

means for transmitting data indicating the type of the radio telephone equipment corresponding to the control signal received by the reception means to the base station;

means for detecting a change in the type of the radio telephone equipment occurring during speech; and means for supplying data indicating the type after the change when the change in the state is detected by the detecting means.

According to this invention, a radio telephone equipment which includes a radiotelephone and a booster removably connected to the radiotelephone, for amplifying an output of the radiotelephone by a constant amount and communicates with the base station via a radio circuit, comprises:

means for determining whether the booster is connected or not; and means for attenuating an output of the radiotelephone when connection of the booster is detected.

BRIEF DESCRIPTION OF THE DRAWINGS

FIG. 5 is a diagram showing a variation in the transmission power level by the booster;

FIG. 16 is a flowchart for illustrating the operation of the conventional base station for comparison with the fourth embodiment;

FIG. 18 is a flowchart for illustrating the operation of the base station of the fourth embodiment;

BEST MODE OF CARRYING OUT THE INVENTION

There will now be described an embodiment of a radio telephone equipment according to this invention with reference to the accompanying drawings. In this case, an embodiment of a radio telephone equipment mounted on a car is explained as an example.

Figure 1:
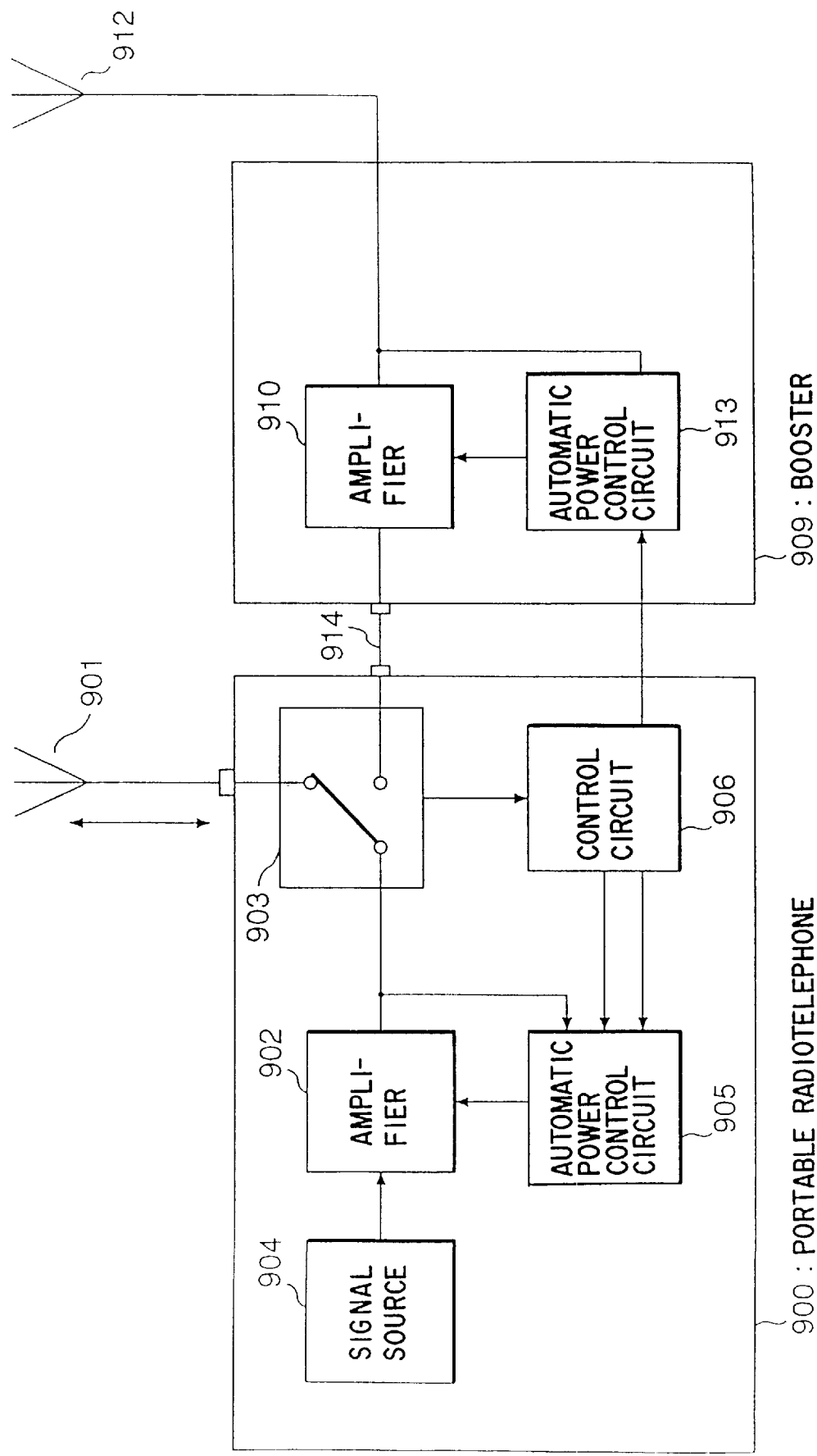
FIG. 1 is a block diagram showing a conventional example of a portable radio telephone equipment.
Figure 2:
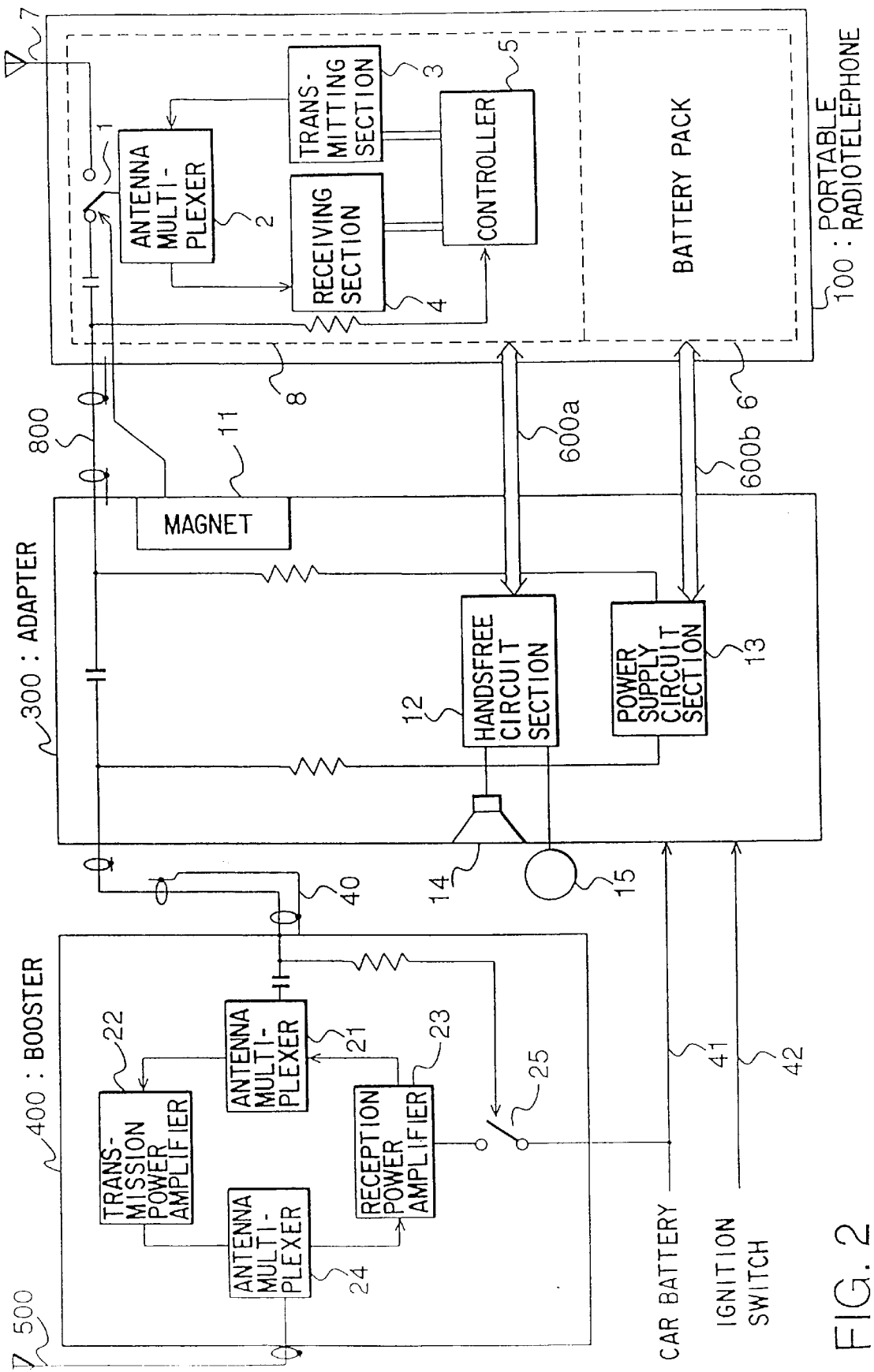
FIG. 2 is a block diagram showing a first embodiment of a portable radio telephone equipment.

FIG. 2 is a block diagram schematically showing the whole construction of an automobile telephone equipment as a first embodiment.

A portable radiotelephone 100 mounted on a car is connected to an adapter 300 via control signal lines 600a, 600b and a high-frequency signal line 800. The adapter 300 is connected to a booster 400 via a coaxial cable 40. The booster 400 is connected to an external antenna 500. For example, the adapter 300 is fixed at the side of the driver's seat, the booster 400 is disposed in the trunk of the car, and the external antenna 500 is disposed on the body portion of the car at the side of the trunk. The portable radiotelephone 100 is connected to the adapter 300 by use of a well-known mechanism which can be easily mounted on and removed from the adapter 300 by the user.

The control signal lines connecting the adapter 300, portable radiotelephone 100 and booster 400 are explained.

The control signal lines 6Oa are signal lines for mode control for a telephone, facsimile or the like, and control for supply of power to a control section 8 of the portable radiotelephone 100. The control signal lines 600b are signal lines for charging control for a battery pack 6 of the portable radiotelephone 100. The high-frequency signal line 800 is a signal line for transmitting and receiving a speech signal superposed on the high-frequency signal, a DC signal indicating the connection state of the portable radiotelephone 100, and a DC signal indicating the power supply control state of the portable radiotelephone 100. The coaxial cable 40 is a signal line for transmitting and receiving DC signals indicating the power supply control state of the adapter 300 and the connection state of the booster 400 and a speech signal superposed on the high-frequency signal.

The detail constructions of the respective sections of the above radio telephone equipment are explained.

The portable radiotelephone 100 is constructed by the control section 8, battery pack 6 and attached antenna 7. The control section 8 is constructed by a switching circuit 1, antenna multiplexer 2, transmitting section 3, receiving section 4 and controller 5. The adapter 300 is constructed by a magnet 11, handsfree circuit section 12, power supply circuit section 13, speaker 14 and microphone 15. The booster 400 is constructed by antenna multiplexers 21, 24, transmission power amplifier 22, reception power amplifier 23 and power switch 25. An output signal of the booster 400 is transmitted via the external antenna 500 mounted on the car.

The operation of power supply of the radio telephone equipment is explained.

The adapter 300 is supplied with power by supplying power to the power supply circuit section 13 via a battery line 41 for car use. When receiving power, the adapter 300 supplies power to the control section 8 via the control signal lines 600a and supplies power to the battery pack 6 via the control signal lines 600b to effect the charging control for the battery pack 6. As will be described in detail below, the power switch 25 is connected in response to the supply of power to the adapter 300 and thus the booster 400 receives power via the battery line 41 for car use.

The transmitting/receiving operation in a state wherein the portable radiotelephone 100 is connected to the booster 400 via the adapter 300 as shown in FIG. 2 is explained.

Flow of Transmission Signal

Although not shown in the drawing, the telephone 100 has a microphone for transmission and a speaker for reception, but the radio telephone equipment uses the microphone and speaker disposed in the adapter 300 to permit handsfree speech, and a case of the handsfree speech is explained here. Since the operation in the handset speech mode is the same as that in the handsfree speech mode, the explanation therefor is omitted.

A voice input via the microphone 15 of the adapter 300 is input to the control section 8 via the handsfree circuit section 12 and control signal lines 600a. The voice input to the control section 8 is modulated in the transmitting section 3 based on the modulation parameter specified by the controller 5. A modulation signal output from the transmitting section 3 is supplied to the adapter 300 via the antenna multiplexer 2, switching circuit 1 and high-frequency signal line 800 and is further supplied from the adapter 300 to the antenna multiplexer 21 of the booster 400 via the coaxial cable 40. The transmission signal input to the antenna multiplexer 21 is amplified by the transmission power amplifier 22. The amplified transmission signal is transmitted via the antenna multiplexer 24 and external antenna 500.

Flow of Reception Signal signal received by the external antenna 500 is input to the antenna multiplexer 24 and then amplified by the reception power amplifier 23. The amplified reception signal is supplied to the coaxial cable 40 via the antenna multiplexer 21 and then supplied to the adapter 300. The reception signal is further supplied from the adapter 300 to the portable radiotelephone 100 via the high-frequency signal line 800 and supplied to the receiving section 4 via the switching circuit 1 and antenna multiplexer 2. In the receiving section 4, the reception signal is demodulated based on the demodulation parameter specified by the controller 5. After this, the demodulated reception signal is supplied to the adapter 300 via the control signal lines 600a and handsfree circuit section 12 and transmitted as a voice from the speaker 14 contained in the adapter 300.

Figure 3:
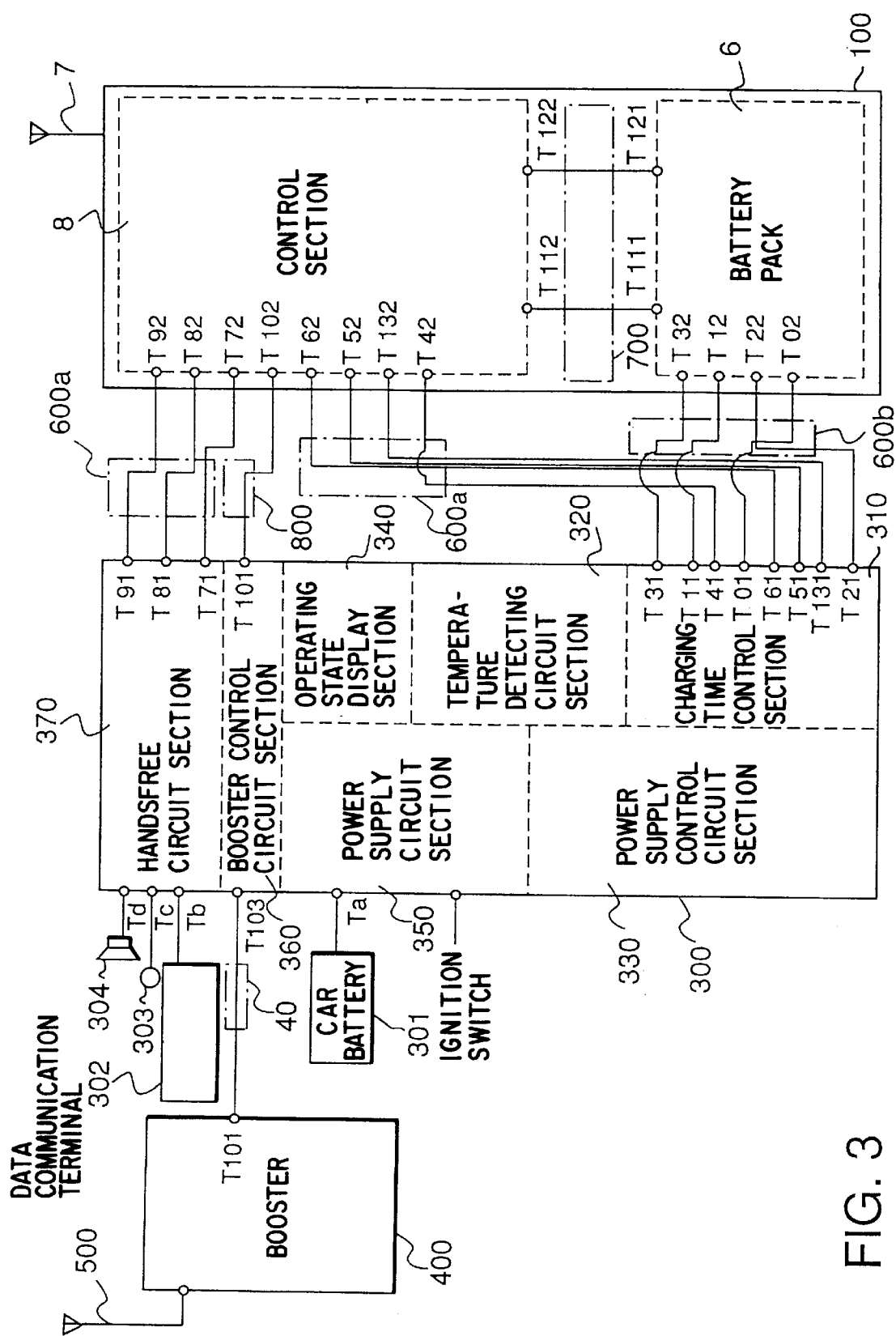
FIG. 3 is a block diagram showing the whole construction of FIG. 2.

FIG. 3 is a diagram showing the details of the signal lines connecting the respective constituents of the radio telephone equipment according to the first embodiment shown in FIG. 2.

The booster 400 is connected to the adapter 300 via the coaxial cable 40. The adapter 300 is connected to the portable radiotelephone 100 via the control signal lines 600a, 600b and the high-frequency signal line 800. In the portable radiotelephone 100, the control section 8 and the battery pack 6 are connected together via control signal lines 700. The adapter 300 is constructed by a charging time control section 310, temperature detecting circuit section 320, power supply control circuit section 330, operating state display section 340, power supply circuit section 350, booster control circuit section 360 and handsfree circuit section 370.

The construction and operation of the respective parts of FIG. 3 are explained.

The charging time control section 310 controls the charging time according to the remaining capacity of the battery pack 6. The temperature detecting circuit section 320 detects temperature information for charging control of the battery pack 6. The power supply control circuit section 330 controls the power supplies of the portable radiotelephone 100 and the power supply circuit section 350. The operating state display section 340 is formed of LEDs, for example, and displays the power supply turn-ON state for confirmation of the power supply turn-ON state of the adapter 300. The power supply circuit section 350 is connected to a car battery 301 via a terminal Ta to supply power to the adapter 300 and portable radiotelephone 100. The booster control circuit section 360 controls the detecting operation of the connection state of the booster 400. The handsfree circuit section 370 is connected to a speaker 304 via a terminal Td and connected to a microphone 303 via a terminal Tc. With this connection, the radio telephone equipment can permit handsfree speech. Further, the handsfree circuit section 370 can be connected to a data communication terminal 302 such as a facsimile device via a terminal Tb. With this connection, the radio telephone equipment also can permit data communication.

Control signals contained in the control signal lines are explained.

The control signal lines 600a have a 7-pin connector, terminals T91, T81, T71 of the handsfree circuit section 370 are respectively connected to terminals T92, T82, T72 of the control section 8 of the portable radiotelephone 100, and terminals T61, T51, T41, T131 of the power supply control circuit section 330 are respectively connected to terminals T62, T52, T42, T132 of the control section 8 of the portable radiotelephone 100. The control signal lines 600b have a 4-pin connector, terminals T31, T21 of the power supply control circuit section 330 are respectively connected to terminals T32, T22 of the battery pack 6 of the portable radiotelephone 100, a terminal T11 of the temperature detecting circuit section 320 is connected to a terminal T12 of the battery pack 6 of the portable radiotelephone 100, and a terminal T01 of the charging time control section 310 is connected to a terminal T02 of the battery pack 6 of the portable radiotelephone 100. The control signal lines 700 have a 2-pin connector, terminals T112, T122 of the control section 8 are respectively connected to terminals T111, T121 of the battery pack 6. The high-frequency signal line 800 is connected between a terminal T101 of the booster control circuit section 360 of the adapter 300 and a terminal T102 of the control section 8 of the portable radiotelephone 100. The coaxial cable 40 is connected between a terminal T104 of the booster 400 and a terminal T103 of the booster control circuit section 360 of the adapter 300.

Control signals are explained.

A reception signal is transmitted between the terminals T91 and T92. A control signal of high logical level or low logical level for turning ON/OFF a switch 372 (FIG. 7) for supplying the reception signal to a speaker 304 is transmitted between the terminals T81 and T82. A transmission signal and a signal for control of switching between paths for the handsfree mode and the facsimile mode are transmitted between the terminals T71 and T72. A signal for detection of connection of the portable radiotelephone 100 and a signal for power supply control of the portable radiotelephone 100 are transmitted between the terminals T101 and T102. A signal for detection of connection of the adapter 300 is transmitted between the terminals T61 and T62. A signal for detection of the connection state of the ignition switch is transmitted between the terminals T51 and T52. A signal for control of power supply from the car battery 301 is transmitted between the terminals T41 and T42. The terminals T131, T132 and the terminals T21, T22 are grounded. A signal for control of charging of the battery pack 6 is transmitted between the terminals T31 and T32. A signal for control of temperature information of the battery pack 6 is transmitted between the terminals T11 and T12. A signal for detection of the battery is transmitted between the terminals T01 and T02.

Next, the detail operation of the booster 400 is explained with reference to FIG. 4.

Figure 4:
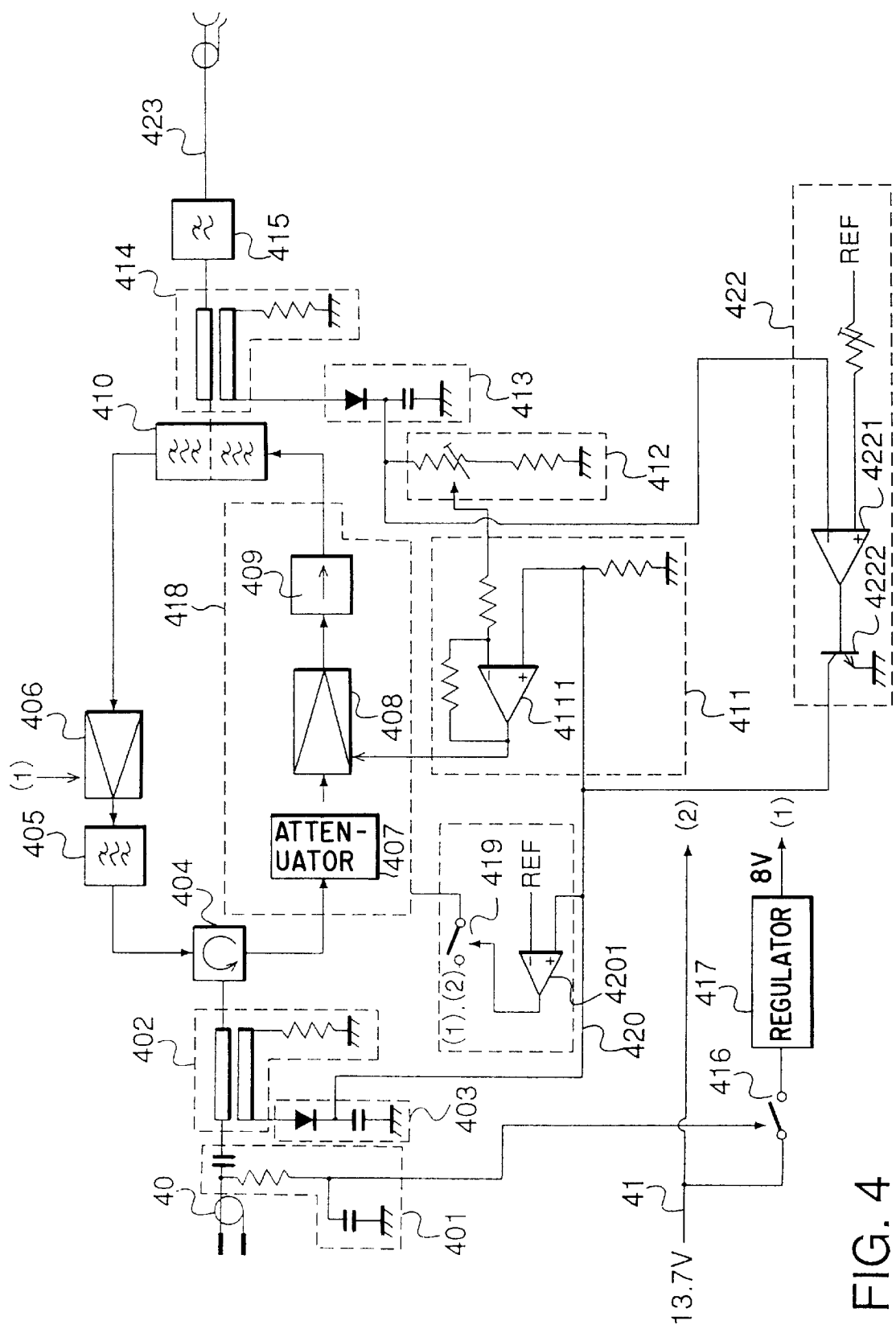
FIG. 4 is a circuit diagram showing the detail construction of the booster of the first embodiment.

FIG. 4 is a diagram showing the detail construction of the booster 400 of the embodiment shown in FIG. 2.

First, a condition that power is supplied to the booster is explained. A power supply control signal (high/low logical level) supplied from the adapter 300 via the coaxial cable 40 is transmitted as a DC component signal superposed on the high-frequency signal. The booster power supply control section 401 detects the power supply control signal and controls connection of the power switch 416 of the booster 400 in accordance with the power supply state of the adapter 300. That is, if the adapter 300 is set in a state in which power is supplied thereto, the adapter 300 supplies a high logical level signal as the power supply control signal to the booster 400. The high logical level signal sets the power switch 416 into the closed state. As a result, a power supply voltage of 13.7 V is supplied to the booster 400 via the car battery line 41. On the other hand, if the power supply control signal is a low logical level signal, the booster 400 sets the power switch 416 into the open state. As a result, no power is supplied to the booster 400.

By the above operation, an 8-V regulator 417 supplies a power supply voltage of 8 V to the reception power amplifier 406.

With this construction, since supply of power to the reception system of the booster 400 is automatically effected in response to connection of the booster 400 to the adapter 300, it becomes unnecessary to provide a power switch (manually operated switch) for power supply to the booster 400. Since the booster is generally disposed in the trunk of the car, a manual power switch is always set in the power-ON state if the switch is mounted on the booster 400 because it is almost impossible to open the trunk and turn ON/OFF the power switch at each time. For this reason, a defect that power consumption is increased occurs. In contrast, according to the booster 400 according to this embodiment, the power consumption in the booster can be automatically controlled and useless power consumption can be prevented.

In the booster 400, power is always supplied to the reception power amplifier 406 if power is supplied to the adapter 300, but power is supplied to the transmitting section 418 according to the presence or absence of input of the transmission signal as described below.

Control of supply of power to the transmitting section 418 is explained below.

A transmission signal transmitted from the adapter 300 side via the coaxial cable 40 is input to the booster power supply control section 401 and only the RF component thereof is extracted. The extracted RF signal is input to a directional coupler 402 and the directional coupler 402 supplies part of the transmission signal to a detector circuit 403.

The detector circuit 403 outputs a voltage value corresponding to a detected signal from the input signal. The voltage value is input to a non-inverting input terminal of a comparator 4201 in an adapter power supply detector circuit 420 and is compared with a reference voltage REF input to an inverting input terminal. An output of the comparator 4201 controls ON/OFF of an adapter power switch 419. For example, if the detected voltage is higher than the reference voltage REF, that is, if a transmission signal is present, the switch 419 is set in the ON state and a power supply voltage of 13.7 V or 8 V is supplied from the car battery to the transmitting section 418. On the other hand, if the reference voltage REF of the comparator 4201 is higher than the detected voltage, that is, if no transmission signal is present, the adapter power switch 419 is set into the OFF state and no power is supplied to the transmitting section 418. Thus, since power is supplied to the transmitting section 418 only when a signal to be transmitted is present, the power consumption can be adequately reduced.

The transmission signal is input to a directional coupler 414 via the transmitting section 418 to which power is supplied. The directional coupler 414 supplies part of the transmission signal to the detector circuit 413. The detector circuit 413 outputs a voltage value corresponding to a detected signal from the input signal. The voltage value is input to a non-inverting input terminal of a comparator 4221 in a 3-W power limiting circuit 422. A reference voltage REF corresponding to 3W to which the power is to be limited is input to an inverting input terminal thereof. An output of the comparator 4221 is supplied to the gate terminal of a transistor 4222. As a result, when a voltage of the detected signal is higher than the reference voltage REF of 3W (when the transmission power can be determined to be equal to or higher than 3W), the transistor 4222 is set in the ON state. Therefore, the input potential of the non-inverting input terminal of the comparator 4201 is lowered and the comparator 4201 outputs a low logical level signal. As a result, the adapter power switch 419 is set in the OFF state and supply of power to the transmitting section 418 is interrupted. On the other hand, if the voltage value of the detected signal is lower than the reference voltage of 3W, the transmission power is determined to be within the specified power range, and therefore, power is supplied to the transmitting section 418.

Thus, if the level of the transmission signal input to the booster 400 is equal to or higher than 3W, supply of power to the transmitting section 418 is interrupted. As a result, when the booster 400 is connected to the radiotelephone 100 having a transmission ability with the upper limit (3W in this embodiment) of communication power defined by the regulation, transmission of power higher than the upper limit can be prevented.

Further, in this embodiment, transmission of power higher than the upper limit is inhibited by interrupting supply of power to the transmitting section 418, but transmission of a transmission signal higher than the upper limit of power defined by the regulation can be interrupted by disposing a switching circuit in the transmission path of the transmission signal and turning OFF the switching circuit as required.

The transmitting operation of a signal in the booster 400 with the above construction is explained.

A transmission signal transmitted from the adapter 300 side via the coaxial cable 40 is input to the directional coupler 402. The directional coupler 402 supplies part of the transmission signal to the detector circuit 403. The detector circuit 403 extracts only a DC component by detecting the input signal and then smoothing the same. The extracted DC component signal is input to a non-inverting input terminal of a comparator 4111 in an automatic gain control circuit 411. The remaining part of the transmission signal from which the DC component is extracted is supplied from the directional coupler 402 to a circulator 404 and input to an attenuator 407 in the transmitting section 418. The attenuator 407 attenuates the input transmission signal by a preset level so as not to destroy a transmission power amplifier 408. The attenuated transmission signal is input to the transmission power amplifier 408. The transmission signal is amplified with a preset amplification factor by the transmission power amplifier 408 and then supplied to an antenna multiplexer 410. The transmission signal output from the antenna multiplexer 410 passes through the directional coupler 414 and part of the output is input to the detector circuit 413. In the detector circuit 413, only a DC component is extracted by detecting the output signal and then smoothing the same. A signal of the extracted DC component is input to a voltage dividing circuit 412. The voltage dividing circuit 412 divides the detected voltage in a preset ratio. The voltage division has an effect that a level difference in the transmission signal before and after amplification caused by amplification by the transmission power amplifier 408 can be removed from an output voltage. The voltage-divided output is input to the inverting input terminal of the comparator 4111 in the automatic gain control circuit 411. After a spurious component is eliminated from the signal passing through the directional coupler 414 in a low-pass filter 415, the signal is transmitted from the external antenna 500 via a high-frequency signal line 423.

The automatic gain control by the automatic gain control circuit 411 is explained.

First, a case wherein two input signals to the automatic gain control circuit 411 are equal is explained. When the two input signals are equal, the transmission signal is already amplified with a preset amplification factor, and therefore, the transmission signal is not subjected to gain control in the transmission power amplifier 408, and it is input to the low-pass filter 415 as it is via an isolator 409, antenna multiplexer 410 and directional coupler 414. Further, after the spurious component is eliminated from the transmission signal by the low-pass filter 415, the transmission signal is transmitted to the exterior via the high-frequency signal line 423 and external antenna 500.

Next, a case wherein the two input signals to the automatic gain control circuit 411 are not equal is explained. In this case, the automatic gain control circuit 411 changes a control voltage applied to the transmission power amplifier 408 based on the result of comparison of the comparator 4111 and adjusts the amplification factor of the transmission power amplifier 408 to compensate for the deficiency of the gain so as to set the two signals input to the comparator 4111 equal to each other. That is, the automatic gain control circuit 411 controls the amplification factor of the transmission power amplifier 408 to reduce the amplification factor of the transmission power amplifier 408 when the detected voltage on the output side (detector circuit 413) is higher than the detected voltage on the input side (detector circuit 403) and increase the amplification factor of the transmission power amplifier 408 when the detected voltage on the output side is lower than the detected voltage on the input side.

The transmission signal amplified by the transmission power amplifier 408 with the thus adjusted amplification factor is input to the low-pass filter 415 via the isolator 409, antenna multiplexer 410 and directional coupler 414. A spurious component is eliminated from the transmission signal by the low-pass filter 415, and the signal after elimination thereof is transmitted to the exterior via the high-frequency signal line 423 and external antenna 500.

The transmission signal thus input to the booster 400 is amplified with a preset amplification factor without using an external level control signal. In addition, the amplification factor is controlled with an extremely high stability. As a result, a control circuit for changing a reference signal of the automatic gain control circuit in the booster based on a level control signal from a portable radiotelephone which is required to be provided in the conventional booster can be omitted and the size of the booster can be reduced.

For example, in a cellular system widely used in U.S.A., the specifying signal for transmission power sent from the base station to the portable radiotelephone 100 is a signal for specifying the transmission power to one level among the six steps of level 2 (27.8 dBm) to level 8 (3.8 dBm). There is a difference of 4 dBm for each step of one level. When the portable radiotelephone 100 is used singly, the transmission power is set according to the specifying signal and the transmission is effected.

If the portable radiotelephone 100 is connected to the booster 400, further amplification of preset amount is effected as described before, the output level from the booster 400 is raised by one step, and the transmission is effected at one level among the six steps of level 1 (30.8 dBm) to level 7 (6.8 dBm). For example, if the portable radiotelephone 100 is connected to the booster 400 in a case where the transmission is effected by the transmission power of level 3 when the portable radiotelephone 100 is used singly, the transmission by the transmission power of level 2 cannot be effected. Therefore, even if the output power is small when the portable radiotelephone 100 is singly used and communication cannot be attained with respect to the base station, the communication can be made possible by connecting the portable radiotelephone 100 to the booster 400.

Further, a case wherein communication can be made possible even in a place where the communication cannot be effected when using the portable radiotelephone 100 singly by directly connecting the external antenna 500 to the terminal T103 of the booster control circuit section 360 without using the booster 400, connecting the portable radiotelephone 100 to the adapter 300 and using the external antenna 500 can be considered. However, even in such a case, since the external antenna 500 is fixed on the car, the directivity thereof cannot be adjusted and communication cannot be sometimes effected. However, according to this embodiment, since the booster 400 is inserted between the external antenna 500 and the adapter 300 to boost the transmission signal, the possibility of communication is further enhanced.

Next, the output level control of the radio telephone equipment is explained in detail.

FIG. 5 is a diagram showing the output level (PL:power level) of the radio telephone equipment.

Figure 8A:
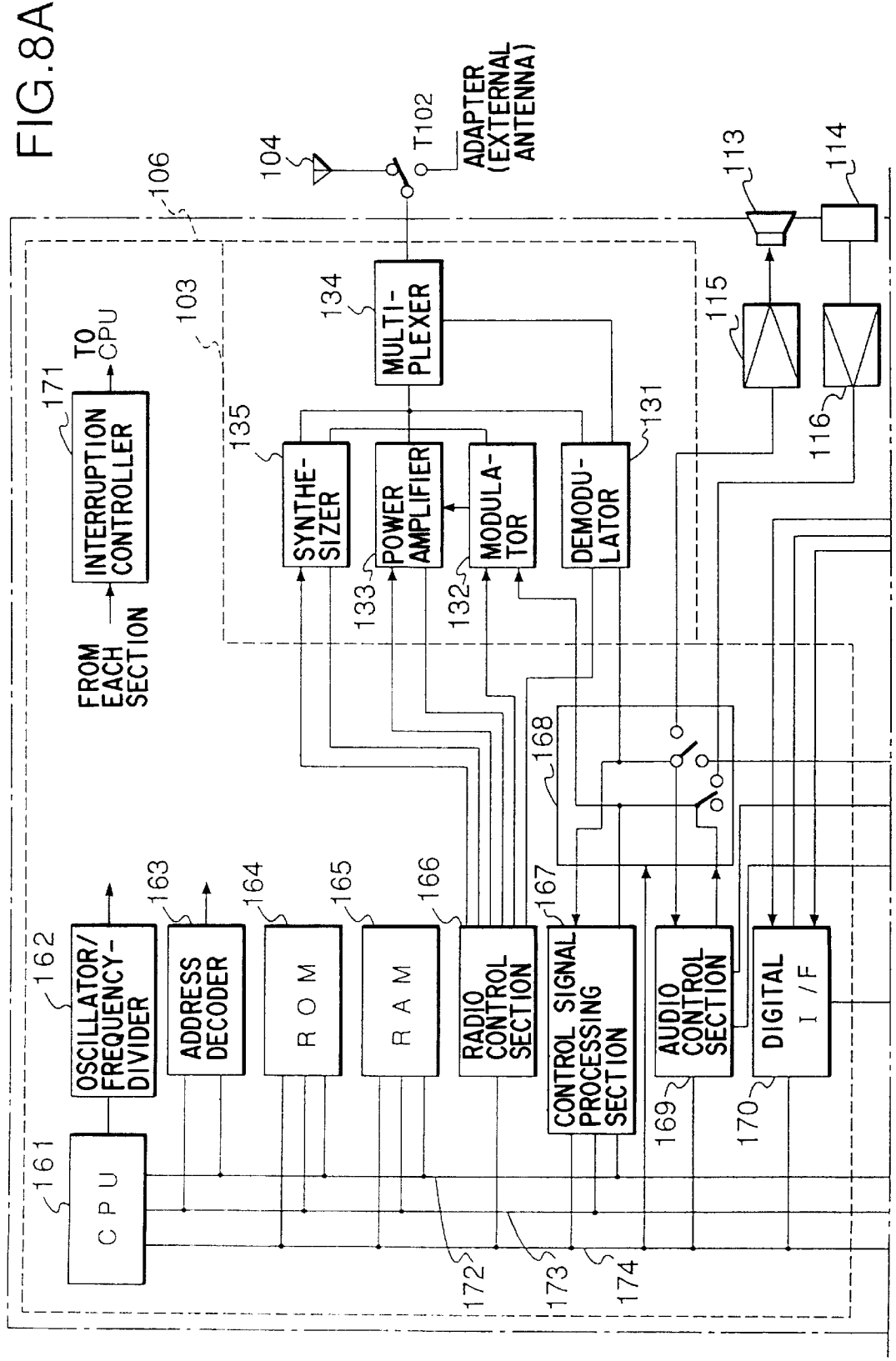
FIGS. 8A and 8B are circuit diagrams showing the detail construction of the portable radiotelephone of the first embodiment.

In a case where the portable radiotelephone 100 is used singly, or the portable radiotelephone 100 is used with only the adapter 300 connected thereto, a power supply voltage of 4.8 V is supplied from the battery pack 6. Although not shown in FIG. 2, 13.7 V of the car battery line 41 is converted to 9.5 V by a regulator and then supplied to the adapter 300. A regulator which is not shown is also provided in the adapter 300 and 9.5 V is further converted to 4.8 V and supplied to the portable radiotelephone 100. In the portable radiotelephone 100, a power supply voltage, in this case, 4.8 V is applied to a power amplifier 133 (FIG. 8A). Further, the portable radiotelephone 100 has a regulator which is not shown, converts 4.8 V to 4 V, and applies a voltage of 4 V to a logic portion other than the power amplifier 133.

Thus, in a case where the portable radiotelephone 100 is used singly, or the portable radiotelephone 100 is used with only the adapter 300 connected thereto, the portable radiotelephone 100 can generate an output of transmission level only up to level 2 (27.8 dBm) since the power supply voltage is as low as 4.8 V. Therefore, even when a level control signal corresponding to level 0, 1 is transmitted from the base station, an output of level 2 is transmitted.

A case where the booster 400 is connected to the above portable radiotelephone 100 is explained. In this embodiment, the booster 400 is always connected to the portable radiotelephone 100 via the adapter 300, but the booster 400 may be connected directly to the portable radiotelephone 100. At this time, as shown in FIG. 2, a power supply voltage 13.7 V is supplied from the car battery and the voltage 13.7 V is also applied to the power amplifier 408 (FIG. 4). A voltage of 8 V adjusted by the regulator 417 is applied to the other portion in the booster 400 and a 4 V voltage or 4.8 V voltage adjusted by the regulator according to the requirements of the adapter 300 and portable radiotelephone 100 is applied to the adapter 300 and portable radiotelephone 100. Thus, since a voltage as high as 13.7 V is supplied to the booster 400, the booster 400 amplifies an input signal to raise the transmission output by two levels.

At this time, if an output of the portable radiotelephone 100 is set as described above, it cannot reach the level specified by the base station even if the booster 400 simply amplifies the input signal by two levels. Therefore, when it is detected that the portable radiotelephone 100 is connected to the booster 400 via the coaxial cable 40 and high-frequency signal line 800, the portable radiotelephone 100 controls the output level thereof by use of software to set the output level to a level (level 2 to level 9) which is lower than the level specified by the level control signal from the base station by two levels. When a transmission signal of such a level is amplified by two levels by the booster 400, the transmission can be resultantly effected with an output of level corresponding to the level control signal from the base station.

Figure 6:
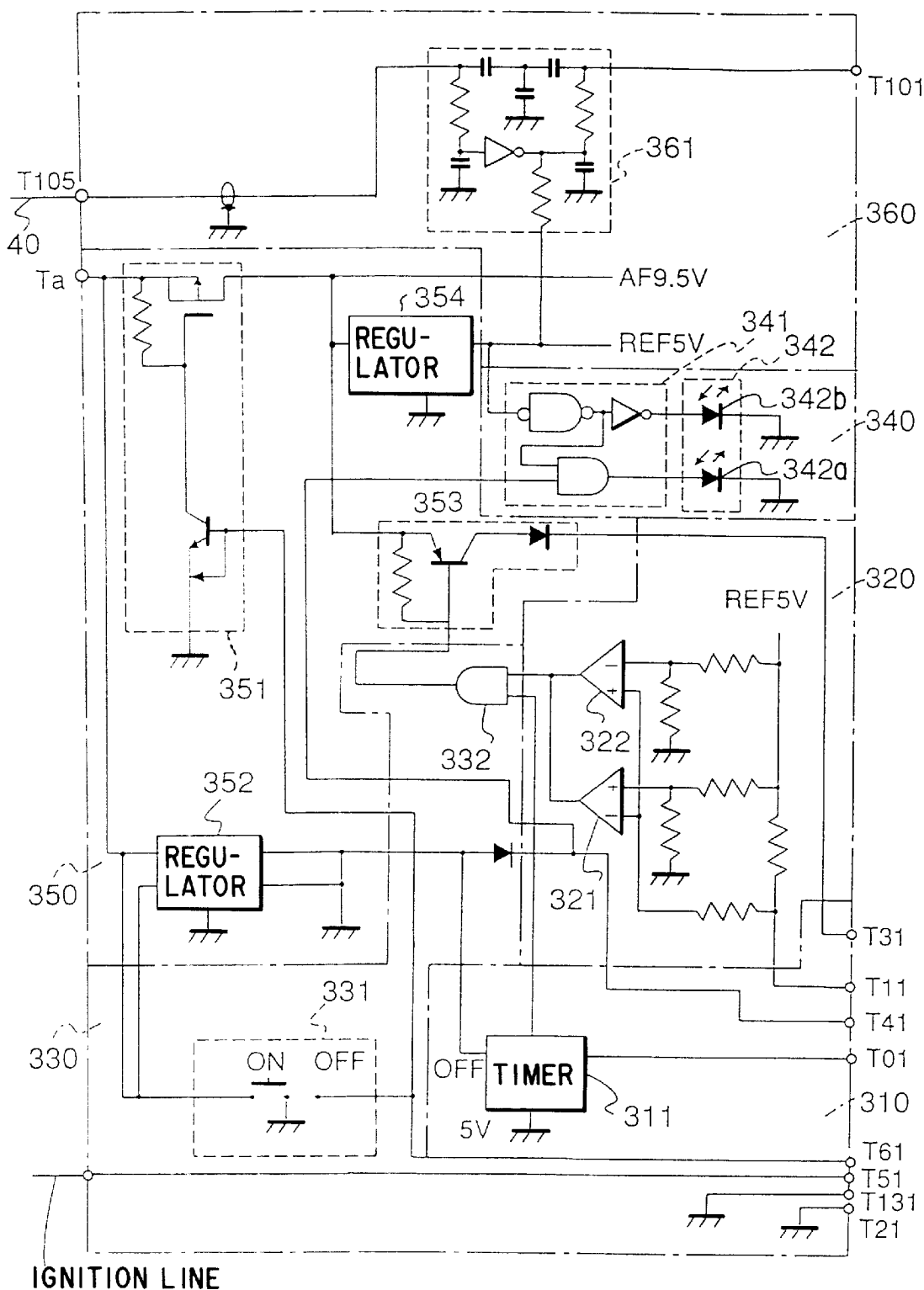
FIG. 6 is a circuit diagram showing the detail construction of a charging time control section, temperature detecting circuit section, operating state display section, power supply circuit section and booster control circuit section of the booster.

FIG. 6 is a block diagram showing the detail of the charging time control section 310, temperature detecting circuit section 320, power supply control circuit section 330, operating state display section 340, power supply circuit section 350 and booster control circuit section 360 shown in FIG. 3.

A display section 342 in the operating state display section 340 turns ON a red lamp 342a if the power switch 331 of the adapter 300 is turned ON and turns ON a green lamp 342b when the portable radiotelephone 100 is mounted. Control of the display section 342 is effected by the operating state display control section 341.

Next, the operation of supplying power to the respective portions of the adapter 300 is explained.

The car battery control switch 351 is connected to an output of a regulator of 9.5 V which is not shown and connected the car battery line 41 via the terminal Ta and effects the ON/OFF control for supply of power of 9.5 V according to ON/OFF of a manually operated switch 331 and a signal line connected to the terminal T61. With this connection, the handsfree circuit section 370 is supplied with a power supply voltage of 9.5 V and a power supply voltage of 5 V by a 5 V regulator 354.

Next, the operation of supply of power to the portions of the portable radiotelephone 100 is explained.

The charging control switch 353 is set into the ON state together with the car battery control switch 351. By this operation, a power supply voltage of 9.5 V is supplied to the battery pack 6 in the portable radiotelephone 100 via the terminal T31. Further, a power supply voltage of 5.5 V stabilized by the 5 V regulator 352 is supplied to the control section 8 in the portable radiotelephone 100 via the terminal T41.

Next, the operation of the booster control circuit section 360 is explained.

When power is supplied to the adapter 300, that is, when the booster control section 361 generates an output signal of 5 V, the booster control section 361 responds to the output signal and outputs a DC signal (power supply control signal) of high logical level to the terminal T103. In the booster control circuit section 360, detection of connection of the booster 400 is effected based on the DC signal superposed on the high-frequency signal transmitted via the high-frequency signal line 800. First, in a case where the booster 400 is connected to the adapter 300, a DC signal of low level is supplied to the booster control section 361 via the terminal T103. As a result, the booster control section 361 outputs a DC signal of high level to the terminal T101. The DC signal of high level is input to the portable radiotelephone 100 via the terminal T102 and it is determined that "the booster is connected". Further, in a case where the booster 400 is not connected to the adapter 300, a DC signal of high level is input to the booster control section 361 via the terminal T103. As a result, the booster control section 361 outputs a DC signal of low level to the terminal T101. The DC signal of low level is input to the portable radiotelephone 100 via the terminal T102 and it is determined that "the booster is not connected".

Figure 8B:
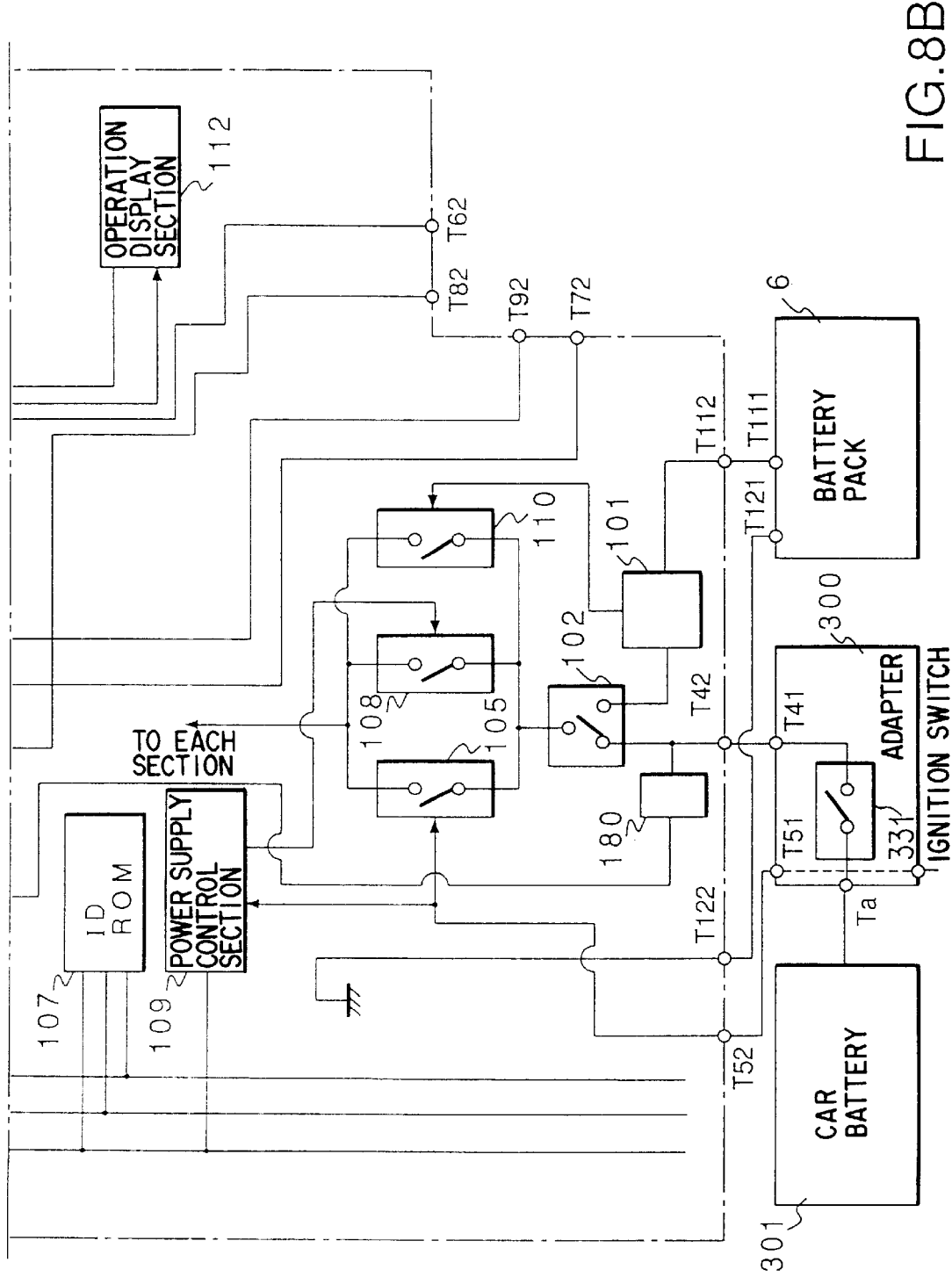

The detail operations of the respective portions shown in FIG. 6 are explained below with reference to FIGS. 8A and 8B in three separated modes of standby mode, speech mode and power-OFF mode. FIGS. 8A and 8B are block diagrams showing the detail of the portable radiotelephone 100 shown in FIG. 2. Further, when the portable radiotelephone 100 is mounted on the adapter 300, the open/closed state of the power switch 101 of the portable radiotelephone 100 is entirely neglected as will be described later. Therefore, the power supply control of the portable radiotelephone 100 is effected in accordance with the open/closed state of the power switch 331 of the adapter 300.

First, a case wherein the portable radiotelephone 100 whose power supply is turned ON and which is set in the standby mode or speech mode is mounted on the adapter 300 which is also supplied with power with the ignition switch of the car rotated to the ON position is explained.

The connection state of a power supply selecting switch 102 of the portable radiotelephone 100 is instantly switched from the terminal T112 on the battery pack 6 side to the terminal T42 on the adapter 300 side when the portable radiotelephone 100 is mounted on the adapter 300. Further, since the ignition switch is set in the ON state, a signal indicating that the ignition switch is set in the ON state is supplied to the portable radiotelephone 100 via the terminals T51, T52 to set the switch 105 into the closed state. Therefore, supply of power to the portable radiotelephone 100 is not instantly interrupted if the power switch 331 of the adapter 300 is set in the ON state and it is supplied with power from the adapter 300 to maintain the standby mode or speech mode. At this time, the operating state display section 342 of the adapter 300 turns ON the red lamp 342a if the power switch 331 of the adapter 300 is set in the ON state and turns ON the green lamp 342b in a state in which the portable radiotelephone 100 is mounted. The operating state display control section 341 (FIG. 6) controls the operating state display section 342. The car battery control switch 351 (FIG. 6) is ON/OFF-controlled to supply a power supply voltage of 5V from the car battery 301 (FIGS. 8A and 8B) via the terminal Ta.

Figure 9:
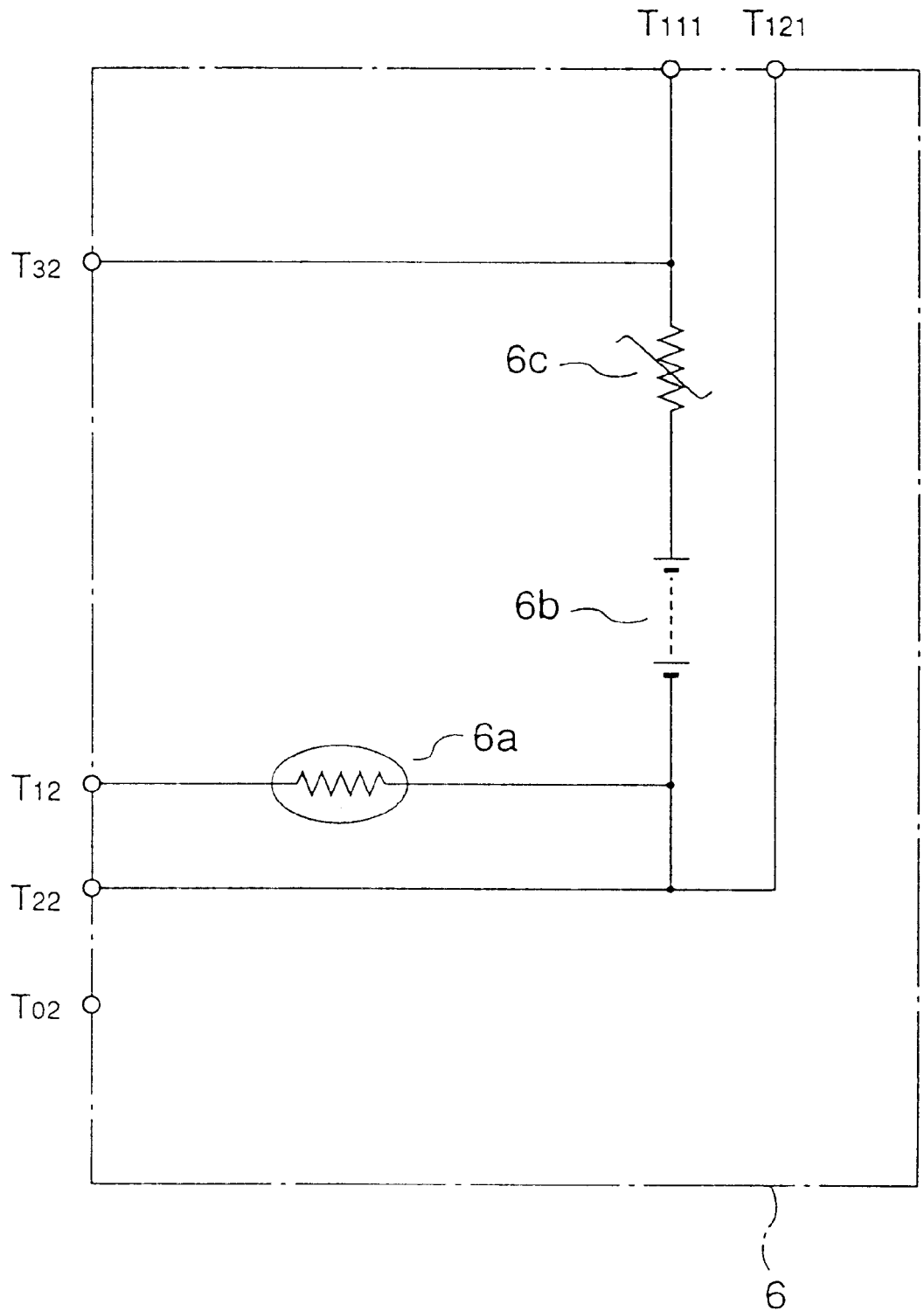
FIG. 9 is a circuit diagram showing the detail construction of a battery pack of the portable radiotelephone.

Now, the charging operation for the battery 6 is explained with reference to FIG. 9. FIG. 9 is a circuit diagram showing the detail of the battery pack 6 shown in FIG. 2. By closing the switch 351 (FIG. 6), a power supply voltage of 9.5 V is supplied to the battery pack 6 of the portable radiotelephone 100 and the handsfree circuit section 370. The power supplying path to the battery pack 6 is made by connecting the terminal T31 and the terminal T32 together. Further, the handsfree circuit section 370 is supplied with a power supply voltage controlled to 5 V by the 5 V regulator. Charging of the battery pack 6 is effected only when the temperature T of the battery pack 6 is set in the chargeable temperature range (0 to 45° C.) of the battery 6b (FIG. 9) of the battery pack 6. The temperature T of the battery pack 6 is detected by a thermistor 6a of the battery pack 6. Temperature information indicating the temperature T of the battery pack 6 is input to the temperature detecting circuit section 320 via the terminal T12, control signal line 600b and terminal T11. Temperature information input to the terminal T11 is converted into a voltage signal corresponding to the detected temperature T of the battery pack 6 and input to the inverting input terminal of the comparator 321 and the non-inverting input terminal of the comparator 322. A reference voltage REF (5 V) is input to the non-inverting input terminal of the comparator 321.

Therefore, in a case where a voltage signal corresponding to the detected temperature T input to the non-inverting input terminal of the comparator 321 is higher than the voltage signal REF of the inverting input terminal thereof, the comparator 321 outputs a DC signal of high logical level and it outputs a DC signal of low logical level in the other case. A reference voltage REF (5 V) is input to the non-inverting input terminal of the comparator 322. Therefore, in a case where a voltage signal corresponding to the detected temperature T input to the inverting input terminal of the comparator 322 is higher than the voltage signal REF of the non-inverting input terminal thereof, the comparator 322 outputs a DC signal of high logical level and it outputs a DC signal of low logical level in the other case. The detected temperature T of the battery pack 6 is set in a range of $0 \leq T \leq 45$ when both of the comparators 321 and 322 output signals of high logical level. Further, an AND gate 332 satisfies the AND condition and outputs a DC signal of high logical level when the detected temperature T is in the range of $0 \leq T \leq 45$ and the charging time timer 311 does not time out yet. By this operation, the charging control switch 353 is connected. The charging current is limited to 120 mA to charge the battery 6b of the battery pack 6. The output current is charged into the battery 6b via the terminal T31 of the charging time control section 310, the control line 600b, the terminal T32 and current control resistor 6c of the battery pack 6.

The comparator 321 outputs a DC signal of low logical level when the voltage signal REF to the non-inverting input terminal thereof is lower than the voltage signal of the inverting input terminal thereof, the comparator 322 outputs a DC signal of low logical level when the voltage signal REF to the inverting input terminal thereof is lower than the voltage signal to the non-inverting input terminal thereof. The AND gate 332 does not satisfy the AND condition and outputs a DC signal of low logical level when either of the comparators 321 and 322 outputs a DC signal of low logical level or the charging time timer 311 has timed out. By this operation, the charging current to the battery pack 6 is not supplied. The booster control circuit section 361 is supplied with a DC signal of low logical level from the coaxial cable 40 via the terminal T103 and outputs a DC signal of high logical level from the terminal T101 when the booster 400 is connected. Further, when the booster 400 is not connected, the booster control circuit section 361 is supplied with a DC signal of high logical level from the coaxial cable 40 via the terminal T103 and outputs a DC signal of low logical level from the terminal T101. The portable radiotelephone 100 detects the connection state of the booster 400 according to the output signals supplied via the terminals T101, T102.

Next, a case wherein the portable radiotelephone 100 whose power supply is not turned ON is mounted on the adapter 300 to which power is supplied with the ignition switch of the car rotated to the ON position is explained below.

The connection state of the power supply selecting switch 102 (FIG. 8B) of the portable radiotelephone 100 is switched from the terminal T112 on the battery pack 6 side to the terminal T42 on the adapter 300 side. By this operation, supply of power to the portable radiotelephone 100 is effected by the car battery 301. Further, since the ignition switch is set in the ON state, a signal indicating the ON state of the ignition switch is supplied to the portable radiotelephone 100 via the terminals T51, T52 to set the switch 105 into the closed state. Therefore, the power switch 331 of the adapter 300 is turned ON and power is supplied to the portable radiotelephone 100 and it is set in the standby state.

A case wherein the portable radiotelephone 100 which is set in the speech mode is mounted on the adapter 300 to which power is supplied with the ignition switch of the car set in the OFF position is explained below.

The connection state of the power supply selecting switch 102 (FIG. 11) of the portable radiotelephone 100 is instantly switched from the terminal T112 on the battery pack 6 side to the terminal T42 on the adapter 300 side. By this operation, supply of power to the portable radiotelephone 100 is effected by the car battery via the terminal T42 of the adapter 300.

The ON/OFF state of the ignition switch of the car is detected by the portable radiotelephone 100 via the adapter 300 when the terminals T51 and T52 are connected together. That is, the ON/OFF state of the ignition switch is supplied to the power supply control section 109 of the portable radiotelephone 100 via the terminals T51, T52 and to the CPU 161. The CPU 161 issues a command to the power supply control section 109 to control the open/closed state of the switch 108 based on the ON/OFF information of the ignition switch and information as to whether the portable radiotelephone 100 is set in the speech state or not. By this open/closed state control, the switch 108 is set into the closed state only when the ignition switch is set in the OFF state and the portable radiotelephone 100 is set in the speech state. The CPU 161 determines whether the portable radiotelephone 100 is set in the speech state or not based on detection or non-detection of the tone signal sent from the base station only while a speech channel is set between the portable radiotelephone 100 and the base station. When it is mounted on the adapter 300, the terminal T62 is connected to the terminal T61. Since the adapter 300 is supplied with power, that is, since the power switch 331 is set in the ON state, a DC signal of high logical level input from the terminal T61 causes the switch 351 to be set into the open state. As a result, power is supplied to the handsfree circuit section 370 and the user of the portable radiotelephone 100 is instantly permitted to start handsfree speech. After the speech is completed, the portable radiotelephone 100 switches the logical level of the signal output from the terminal T62. As a result, the switch 351 is set into the closed state and supply of power to the handsfree circuit section 370 is interrupted. Also, the charging of the battery 6b of the battery pack 6 is not effected.

A case wherein the portable radiotelephone 100 which is set in the standby mode and whose power supply is not turned ON is mounted on the adapter 300 to which power is supplied with the ignition switch of the car set in the OFF position is explained below.

The connection state of the power supply selecting switch 102 (FIG. 11) is switched from the terminal T112 on the battery pack 6 side to the terminal T42 on the adapter 300 side by mounting the portable radiotelephone 100 on the adapter 300. Like the above case, the CPU 161 controls the open/closed state of the switch 108. That is, the CPU 161 controls the power supply control section 109 to set the switch 108 into the open state when the ignition switch is set in the OFF state and the portable radiotelephone 100 is not set in the speech mode (it is set in the standby mode and power is not supplied thereto). In this case, since the ignition switch is set in the OFF state, the switch 105 is set in the closed state and since the switch 110 is a switch which is set in the closed state only while the power switch 110 of the portable radiotelephone 100 is kept depressed, it is set in the open state in this case.

A case wherein the portable radiotelephone 100 which is set in the speech/standby mode and whose power supply is not turned ON is dismounted from the adapter 300 is explained below.

The connection state of the power supply selecting switch 102 (FIG. 11) is switched from the terminal T42 on the adapter 300 side to the terminal T112 on the battery pack 6 side by dismounting the portable radiotelephone 100 from the adapter 300. By this operation, power to the portable radiotelephone 100 is supplied from the battery pack 6 side. The portable radiotelephone 100 at time other than the power-OFF time is supplied with power from the battery pack 6 to maintain the state set before the dismounting, that is, the standby state or speech state.

Figure 7:
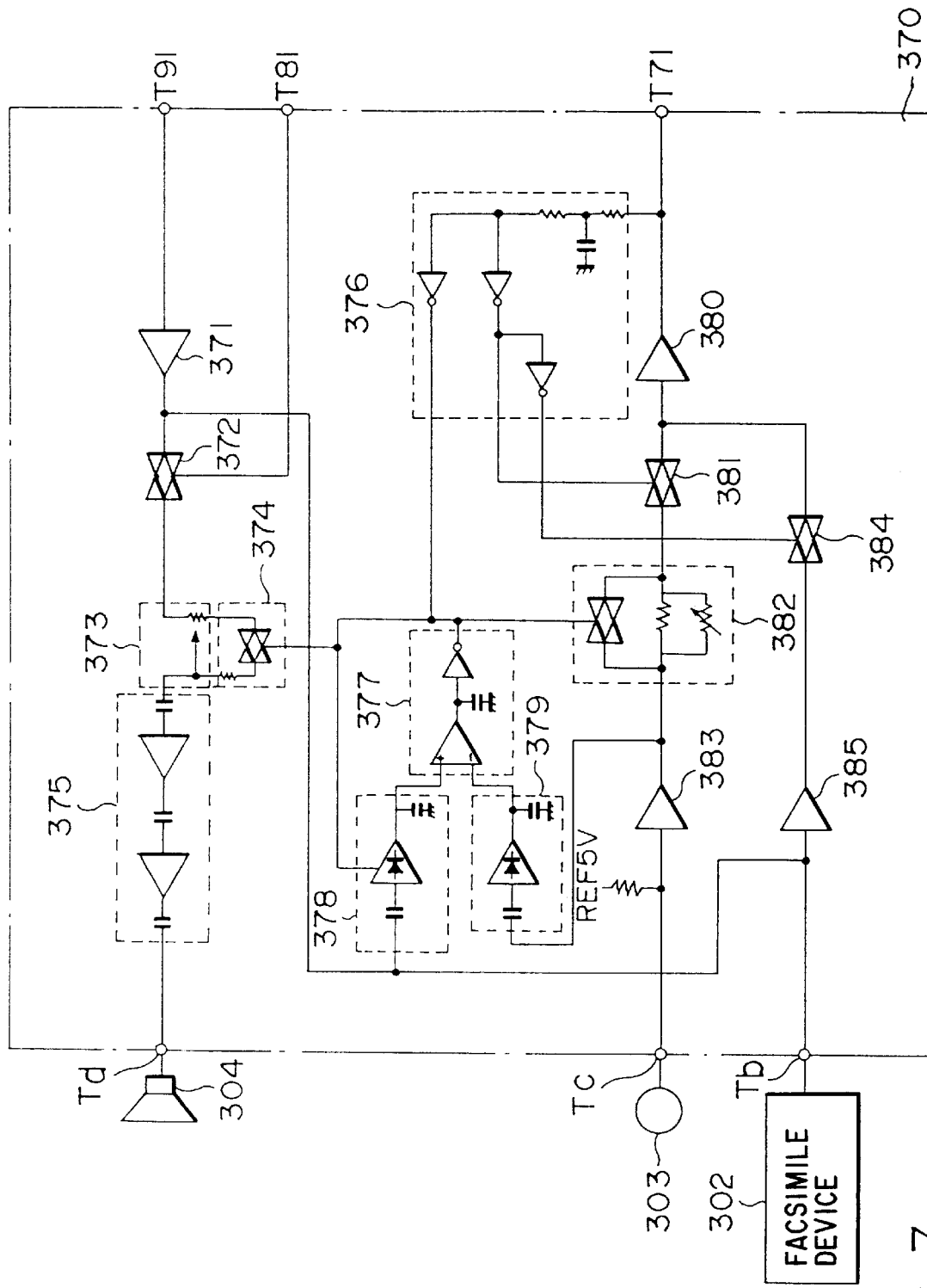
FIG. 7 is a circuit diagram showing the detail construction of a handsfree circuit section of the booster.

The operation of the handsfree circuit section 370 is explained in detail below with reference to FIGS. 7 and 3.

The terminals T71, T81, T91 of the handsfree circuit section 370 are respectively connected to the terminals T72, T82, T92 of the portable radiotelephone 100 via the control signal line 600a. The terminal T91 of the portable radiotelephone 100 is an input terminal for a reception signal transmitted from the portable radiotelephone 100 to the handsfree circuit section 370. The terminal T71 of the handsfree circuit section 370 is an output terminal for a transmission signal transmitted to the portable radiotelephone 100. Further, the terminal T81 of the handsfree circuit section 370 is an input terminal for a speaker signal which is set to a high logical level in the case of speech mode and to a low logical level in the case of data communication mode such as facsimile communication. The terminal T71 of the handsfree circuit section 370 inputs a transmission/handsfree signal which is set to a high logical level when the data communication mode is selected and to a low logical level when the handsfree mode is selected via the terminal T72 of the portable radiotelephone 100 side. The handsfree speech can be made when a signal of low logical level appears on the terminal T71 of the handsfree circuit section 370 and a signal of high logical level indicating the speech mode appears on the terminal T81. Further, a speaker path switch 372 is set ON by a signal of high logical level on the terminal T81 to make a signal path for a speaker signal between the terminals Td and T91. An audio/data detection circuit 376 outputs output signals of low and high logical levels by a low logical level signal appearing on the terminal T71. The two output signals set a data communication switch 384 into the open state to break the data communication signal path and set an audio switch 381 into the closed state to make a signal path for handsfree speech.

A reception signal appearing on the terminal T92 of the portable radiotelephone 100 is input to the terminal T91 of the handsfree circuit section 370 via the control signal line 600a. The reception signal is amplified to a preset level by an amplifier 371 and supplied to a volume circuit 373 via the speaker path switch 372. At this time, as will become clear from the explanation described later, a receiving insertion loss changing switch 374 is set into the connection state according to an output of a comparator 377 for reception/transmission level comparison. By this operation, an output of the volume circuit 372 is greatly attenuated and input to an amplifier 375. Thus, the output volume of the amplifier 375 output to a handsfree speaker 304 via the terminal Td is attenuated to a degree which does not affect the bidirectional speech. On the other hand, part of the output of the amplifier 371 is branched and supplied to an amplifying/rectifying circuit 378 as a reception monitor signal. After this, the reception monitor signal is input to the non-inverting input terminal of the reception/transmission level comparing comparator 377. An input voltage to the reception/ transmission level comparing comparator 377 is biased by the amplifying/rectifying circuit 378 such that a voltage on the non-inverting input terminal side becomes higher when neither the reception signal nor the transmission signal is present. When a reception signal of a preset level or higher level is input to the reception/ transmission level comparing comparator 377, the output thereof is set to a low logical level. Therefore, the receiving insertion loss changing switch 374 is set into the open state and the gain of the reception system is controlled to increase.

A transmission signal input from the handsfree microphone 303 is supplied to an amplifier 383 via the terminal Tc, amplified to a preset level, and then supplied to a transmitting insertion loss changing circuit 382. At this time, a large loss is applied to the transmission signal according to an output of the reception/transmission level comparing comparator 377 and the transmission signal is attenuated. Therefore, the transmission signal is attenuated to a degree which does not affect the bidirectional speech. Further, the transmission signal is output from the terminal T71 via the audio switch 381 and amplifier 380 and then input to the terminal T72 of the portable radiotelephone 100 via the control signal line 600a. On the other hand, part of the output of the amplifier 383 is branched and supplied to an amplifying/rectifying circuit 379 as a transmission monitor signal. After this, the transmission monitor signal is input to the inverting input terminal of the reception/transmission level comparing comparator 377. That is, the comparing comparator 377 compares the level of the reception monitor signal with the level of the transmission monitor signal and controls the open/closed states of the receiving insertion loss changing circuit 374 and transmitting insertion loss changing circuit 382 such that the signal having a higher level will be attenuated.

Next, a case wherein the facsimile device 302 which is a data communication terminal is connected to the adapter 300 to effect communication is explained.

In this case, a transmission/handsfree signal is output from the terminal T72 of the portable radiotelephone 100 and a speaker signal of low logical level is output from the terminal T82. In this case, the speaker path switch 372 is set into the open state by a speaker signal of low logical level of the terminal T82. Further, the audio switch 381 is set into the open state by a transmission/handsfree signal of high logical level of the terminal T72. Therefore, in this case, a facsimile transmission signal input from the facsimile device 302 via the terminal Tb is amplified to a preset level by the amplifier 385 and output to the terminal T71 via the data communication switch 384. The transmission signal is input to the terminal T72 of the portable radiotelephone 100 via the control signal line 600a. On the other hand, a facsimile reception signal is input to the terminal T91, amplified to a preset level by the amplifier 371 and then input to the facsimile device 302 via the terminal Tb.

FIGS. 8A and 8B are block diagrams showing the detail construction of the portable radiotelephone 100 shown in FIG. 2, and the construction and operation of the portable radiotelephone 100 are explained below with reference to FIGS. 8A and 8B.

A radio section 103 is constructed by a demodulator 131, modulator 132, power amplifier 133, transmission/reception multiplexer 134, and synthesizer 135.

The demodulator 131 demodulates a reception signal from the base station input via the antenna of the portable radiotelephone 100 and transmission/reception multiplexer 134. The signal contains various control signals such as a level control signal, audible sound signal and the like. An output of the demodulator 131 is supplied to a control signal processing section 167 via a switching circuit 168 and supplied to the handsfree circuit 370 (FIG. 3) of the adapter 300 via the terminal T92 as a reception signal by the switching operation of the switching circuit section 168, and it is also output from the speaker 113 of the portable radiotelephone 100.

The modulator 132 modulates an audible sound signal and control signal supplied from an audio control section 169 via the switching circuit section 168, a transmission signal from the handsfree circuit section 370 (FIG. 3) of the adapter 300 supplied via the terminal T72 and switching circuit 168, or a transmission signal from the microphone 114 of the portable radiotelephone 100 to create a transmission signal.

The power amplifier 133 amplifies a transmission signal output from the modulator 132. The transmission/reception multiplexer 134 transmits a reception signal input via the antenna 104 to the demodulator 131 and transmits a transmission signal input via the modulator 132 and power amplifier 133 to the antenna 104.

The synthesizer 135 is a channel selection local oscillator and specifies a frequency to be demodulated by the demodulator 131 and a frequency to be modulated by the modulator 132.

An audio control section 106 is constructed by a CPU 161, oscillator/frequency-divider 162, address decoder 163, ROM 164, RAM 165, radio control section 166, control signal processing section 167, audio control section 169, digital interface 170 and interruption controller 171. Further, in the drawing, 101 denotes a power switch of the portable radiotelephone 100, 102 a power supply selecting switch, 105 an ignition detection switch, 107 an ID ROM, 108 a soft switch, 109 a power supply control section, 110 a power switch of the adapter, 172 an 8-bit data path, 173 an address path, and 174 a control path.

The CPU 161 effects the general control for the audio control section 106. The oscillator/frequency-divider 162 supplies a clock to the CPU 161, divides the frequency of the clock and then supplies the result as a timing signal to the respective portions.

The address decoder 163 outputs a preset operation signal to the respective portions according to an instruction signal from the CPU 161.

The ROM 164 stores various programs necessary for the operation of the CPU 161.

The RAM 165 stores various data for each processing time of the CPU 161.

The radio control section 166 controls the radio section 103 based on the instruction of the CPU 161. For example, the radio control section 166 designates a frequency to be specified by the synthesizer 135, an amplification factor with which the power amplifier 133 amplifies, a modulation factor with which the modulator 132 modulates, and receives an out-of-phase signal output from the synthesizer 135 to take the erroneous operation preventing measure and an output detection signal output from the power amplifier 133 and transmits the signals to the CPU 161. The amplification factor of the power amplifier 133 is controlled according to the level control signal from the base station.

The audio control section 169 supplies a control signal in the reception signal demodulated by the demodulator 131 to the control signal processing section 167 and supplies an audible sound signal in the reception signal to the speaker 113 via the output amplifier 115. Further, the audio control section 169 transmits a control signal output from the control signal processing section 167 and an audible sound signal output from the microphone 114 via the input amplifier 116 to the modulator 132 via the switching circuit section 168. The audio control section 169 has a function of wave-shaping a control signal supplied to the control signal processing section 167 and filtering a control signal to be supplied to the modulator 132.

The control signal processing section 167 sets up the bit synchronization, frame synchronization with a control signal output from the audio section 168, fetches control data from the base station contained in the control signal which is a serial signal as a parallel signal, and supplies control data as a parallel signal to be transmitted to the base station to the audio control section 169 as a control signal which is a serial signal.

The audio control section 169 effects various control operations. For example, the audio control section 169 effects the switching control for transmitting a reception signal to either the control signal processing section 167 or output amplifier 115 and the switching control for fetching a transmission signal output from either the control signal processing section 167 or input amplifier 116. Further, the audio control section 169 creates a speaker signal which is set to a high logical level in the speech mode for permitting the ordinary speech and to a low logical level in the facsimile mode for permitting data communication such as facsimile communication and a handsfree signal which is set to a high logical level when the handsfree speech is selected and to a low logical level when it is not selected, and outputs them to the terminals T82 and T72.

The digital interface 170 transfers a signal between the audio control section 106 and the operation display section 112. Further, ON/OFF information of the ignition switch of the car is input to the digital interface 170 from the terminal T52 and the information is supplied to the CPU 161. The CPU 161 determines whether the portable radiotelephone 100 is set in the speech state or not based on the presence of absence of a tone signal (supervisory tone) of a preset frequency from the base station.

An adapter detecting section 180 is connected to the terminal T42, detects that the adapter 300 whose power supply is turned ON is connected to the portable radiotelephone 100 based on a variation in the voltage of the terminal T42, and supplies the information to the CPU 161 via the digital interface 170.

An ON/OFF signal of the ignition switch is input to the CPU 161 via the terminal T52, switch 105 and power supply control section 109. By this signal, the switch 105 is set into the closed state when the ignition switch is set ON and into the open state when the ignition switch is OFF.

The soft switch 108 effects the following control based on information supplied from the CPU 161 and indicating whether the portable radiotelephone 100 is set in the speech state or not, ON/OFF information of the ignition switch and information relating to the connection or disconnection of the adapter 300.

First, a case wherein the CPU 161 detects that the adapter 300 whose power supply is turned ON is connected to the portable radiotelephone 100 based on a detection signal from the adapter detecting section 180 is explained. When the adapter 300 whose power supply is not turned ON is connected to the portable radiotelephone 100, the connection state of the switch 102 is switched to interrupt the supply of power to the portable radiotelephone 100 at the time of connection. In a case wherein the ignition switch is set in the OFF state and the portable radiotelephone 100 is set in the speech state, the CPU 161 sets the soft switch 108 into the ON state, and in a case wherein the ignition switch is set in the OFF state and the portable radiotelephone 100 is not set in the speech state, it sets the soft switch 108 into the OFF state. As a result, in a case where the ignition switch is set in the OFF state, power is supplied to the handsfree circuit section 370 to permit the handsfree speech only when the portable radiotelephone 100 set in the speech state is connected to the adapter 300 whose power supply is set in the ON state. On the other hand, when the portable radiotelephone 100 which is not set in the speech state is connected to the adapter 300 whose power supply is set in the ON state, no power is supplied to the handsfree circuit section 370 so that useless power consumption can be prevented.

The interruption controller 171 receives an interruption command from the respective portions and interrupts the CPU 161. Further, the power supply control section 109 effects the control operation to connect the power supply selecting switch 102 to the terminal T42 so as to be supplied with power from the car battery 301 when the portable radiotelephone 100 is mounted on the adapter 300 and connect the power supply selecting switch 102 to the terminal T112 so as to be supplied with power from the battery pack 200 when the portable radiotelephone 100 is dismounted from the adapter 300.

Next, the construction of the battery pack 6 shown in FIG. 3 is explained with reference to FIG. 9.

The battery pack 6 is constructed by the thermistor 6a for temperature detection, battery 6b, and current control resistor 6c for controlling the charging current and the like.

Next, the operation of the battery pack 6 is explained for each state of the portable radiotelephone 100 and for each type of the radio telephone equipment.

When the portable radiotelephone 100 set in the standby or speech state is used singly, the power supply selecting switch 102 (FIG. 8B) is connected to the battery pack 6. By this connection, the portable radiotelephone 100 is supplied with power from the battery pack 6 via the terminal T111.

When the portable radiotelephone 100 set in the standby or speech state is mounted on the adapter 300 in which the switch 331 (FIG. 6) is set in the ON state, the battery pack 6 detects the temperature T of the battery 6b by means of the thermistor 6a and supplies temperature information to the adapter 300 via the terminal T12. The AND gate 332 (FIG. 6) of the adapter 300 detects that the temperature T is 0 to 45° C. based on the temperature information and controls the supply of power. Further, the charging time timer 311 (FIG. 6) of the adapter 300 determines the capacity of the battery pack 6 via the terminal T02 of the battery pack 6 and controls the charging time. Charging from the adapter 300 to the battery pack 6 is effected via the terminals T31, T32. Also, the portable radiotelephone 100 is supplied with power from the car battery 301 via the terminals T32, T111, T112. In the battery pack 6, an amount of current is adjusted by the current control resistor 6c so as to be suitable for charging and then the battery 6b is charged. Further, when the AND gate 332 of the adapter 300 detects that the temperature T is not in the range of 0 to 45° C., the switch 353 is set into the open state to interrupt supply of power via the terminal T31. As a result, charging from the adapter 300 to the battery pack 6 is interrupted. Supply of power to the portable radiotelephone 100 is effected directly from the adapter 300 via the terminals T41, T42.

If the portable radiotelephone 100 to which power is not supplied and in which the switch 101 (FIG. 8B) is set in the ON state is mounted on the adapter 300 which is connected to the car battery 301 being supplied with power and in which the switch 331 is set in the ON state, the portable radiotelephone 100 is supplied with power from the car battery 301 via the terminal T42 of the adapter 300.

If the portable radiotelephone 100 which is supplied with power is mounted on the adapter 300 which is not supplied with power, the connection state of the switch 102 (FIG. 8B) is changed from the battery pack 200 to the adapter 300 by this mounting operation, but since no power is supplied from the adapter 300, no power is supplied to the portable radiotelephone 100. The terminal T22 is grounded.

Figure 10:
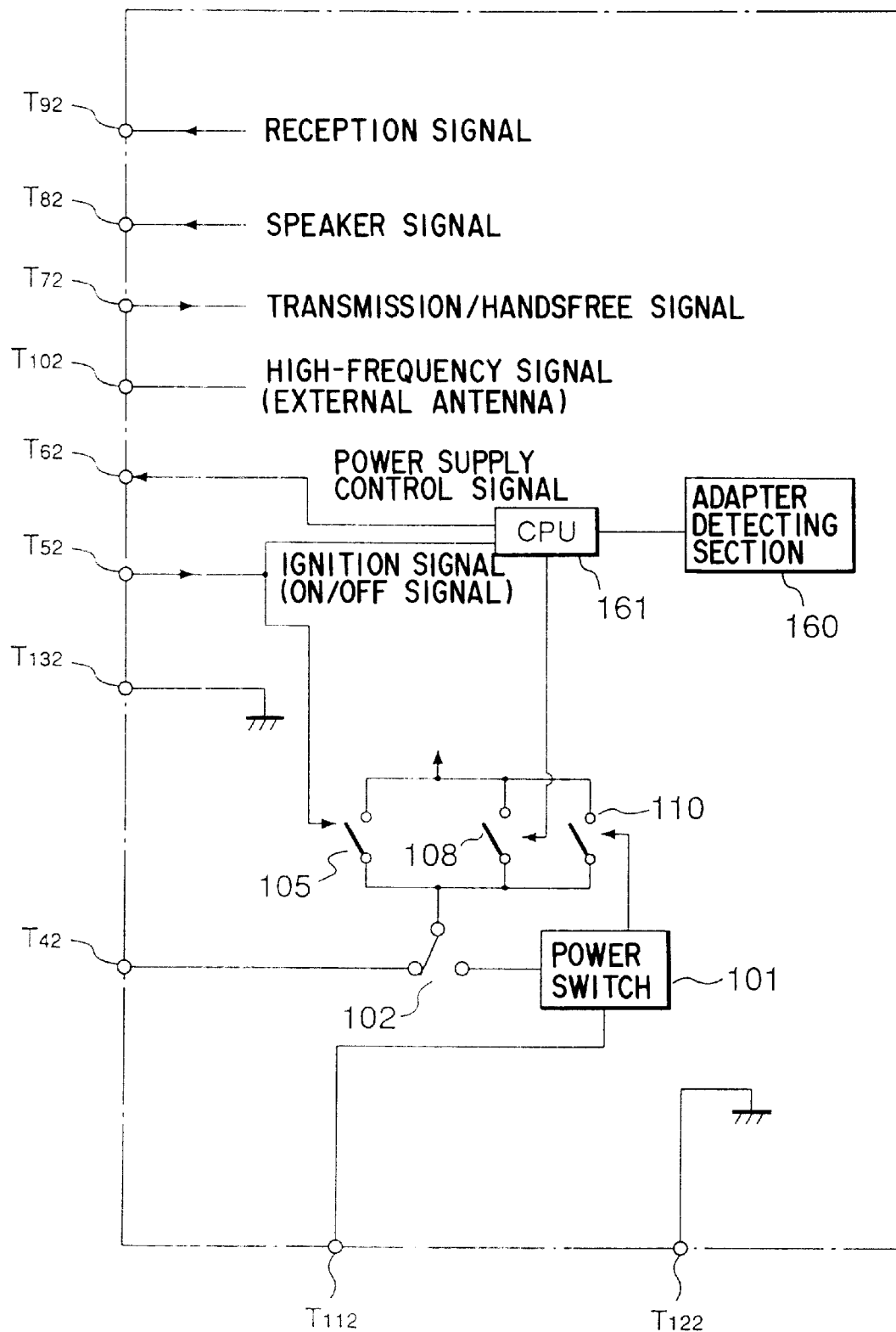
FIG. 10 is a diagram showing signal terminals of the portable radiotelephone.

FIG. 10 is a diagram for explaining the terminals and signals of the portable radiotelephone 100 shown in FIG. 2. Control for the signal lines and switches is explained below.

The portable radiotelephone 100 is supplied with power from the battery pack 6 when the power switch 101 is set in the closed state and is not supplied with power when the power switch is set in the open state. When the portable radiotelephone 100 is mounted on the adapter 300, the power supply selecting switch 102 is connected to the terminal T42 side and it is supplied with power from the car battery 301. Further, when the portable radiotelephone 100 is dismounted from the adapter 300, the power supply selecting switch 102 is switched to the terminal T112 side and it is supplied with power from the battery pack 6.

A reception signal is input from the portable radiotelephone 100 to the adapter 300 via the terminal T92.

As a speaker signal, a high or low logical level signal is input from the portable radiotelephone 100 to the adapter 300 via the terminal T82. When a high logical level signal is input to the speaker 14 (FIG. 2), it is operated to generate a reception voice. Further, when a low logical level signal is input to the speaker 14, it is not operated and does not generate a reception voice.

As a transmission/handsfree signal, a high or low logical level signal is input from the adapter 300 to the portable radiotelephone 100 via the terminal T72. When the transmission/handsfree signal is a high logical level signal, the adapter 300 is set into the facsimile mode, and when it is a low logical level signal, the adapter 300 is set into the handsfree mode.

The terminal T102 is connected to the external antenna 500 via the high-frequency signal line 800 and coaxial cable 40 and transmits/receives a speech signal and connection information of the adapter 300 and booster 400. The portable radiotelephone 100 determines that the booster 400 is connected when a DC signal of high logical level is input thereto via the terminal T102 and determines that the booster 400 is not connected when a low logical level signal is input.

The ignition (ON/OFF) signal is input to the CPU 161 via the terminal T52 and controls the open/closed state of the switch 105.

The CPU 161 generates a power supply control signal in the ON/OFF state via T62 based on an output of an adapter detecting section 160 and controls the open/closed state of the soft switch 108.

The terminal T122 is grounded.

As described above, according to this embodiment, the portable radiotelephone controls the output level according to the level control signal transmitted from the base station, the booster has an amplifier for amplifying the output of the portable radiotelephone by a preset amount, and the amplification factor of the amplifier is controlled to keep the gain of the booster (a difference between the output of the portable radiotelephone and the output of the amplifier in the booster) constant. Thus, since the portable radiotelephone and the booster are independently controlled, the booster can be connected to any type of portable radiotelephone.

Further, the radio telephone equipment has a circuit for detecting the input level in the booster and turns ON/OFF the power supply of the transmission circuit section by determining the presence or absence of a transmission signal based on the level of the input signal. Therefore, since power can be supplied only when the transmission signal is present, the power consumption can be adequately reduced.

Further, the radio telephone equipment has a circuit for detecting the output level in the booster, and when a transmission output is larger than a certain value, it limits the output thereof or turns OFF the power supply by determining occurrence of erroneous connection. Therefore, even when the portable radiotelephone having a transmission ability of the upper limit of the transmission power defined by the regulation is connected to the booster, an output outside the pre-defined power range will not be output.

Further, when the booster is connected to the portable radiotelephone, the transmission output of a channel in which the amplification amount of the booster is small is previously enhanced by taking a deviation between the channels only of the booster into consideration. Therefore, it becomes possible to provide a booster having a small deviation between the channels.

Further, when it is detected that the booster is connected to the portable radiotelephone, a transmission signal is output at a level of level 2 to level 8, amplified to a level of level 1 to level 7 by the booster and then output. Therefore, the conventional control circuit for changing the reference signal of the automatic gain control circuit in the booster according to the level control signal from the portable radiotelephone becomes unnecessary and the number of parts can be reduced.

Figure 11:
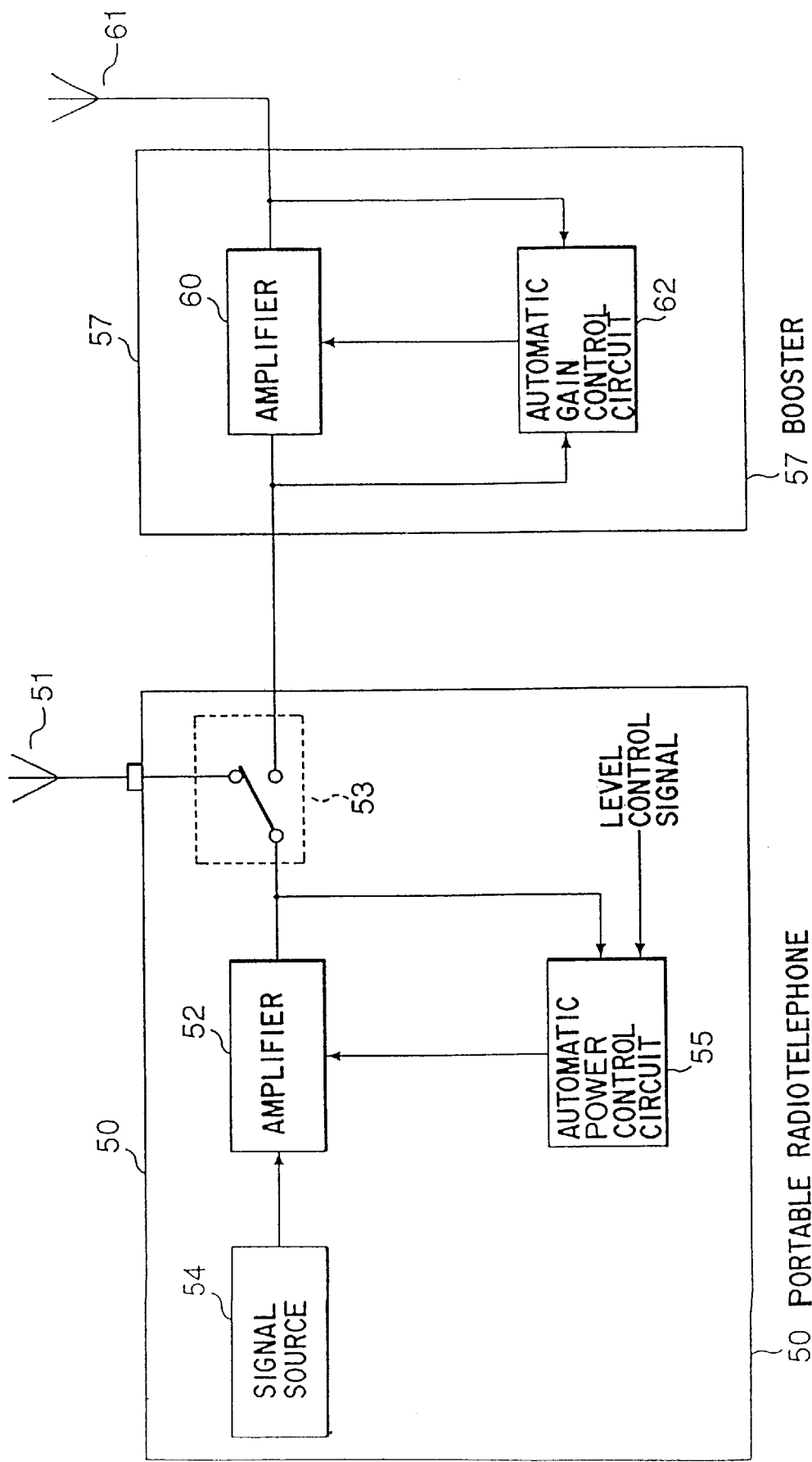
FIG. 11 is a block diagram showing a second embodiment of a portable radio telephone equipment according to this invention.

Other embodiments of this invention are explained below. In the other embodiments, portions which are the same as those of the first embodiment are denoted by the same reference numerals and the detail explanation therefor is omitted. FIG. 11 is a construction diagram showing a second embodiment of a radio telephone equipment according to this invention.

This embodiment is an example in which a portable radiotelephone 50 is directly connected to a booster 57 as shown in FIG. 4 without connecting an adapter therebetween.

That is, the radio telephone equipment of this embodiment includes the portable radiotelephone 50, booster 57 and external antenna 61. The portable radiotelephone 50 is constructed by a signal source 54, switching circuit 53, automatic gain control circuit 55 and antenna 51. The booster 57 is constructed by an amplifier 60 and automatic gain control circuit 62.

When the booster 57 is not used, the switching circuit 53 connects the output of the amplifier 52 with the antenna 51. The signal source 54 generates a control signal and speech signal to be transmitted. A signal generated from the signal source 54 is amplified by the amplifier 52. The amplified signal is supplied to the switching circuit 53 and transmitted from the antenna 51. Further, a signal which is part of a transmission signal extracted from the output of the amplifier 52 is amplified with an amplification factor based on a level control signal supplied from a base station (not shown) in the automatic gain control circuit 55.

When the booster 57 is used, the switching circuit 53 connects the output of the amplifier 52 with the input of the amplifier 60. The signal source 54 generates a control signal and speech signal to be transmitted. A signal generated from the signal source 54 is amplified by the amplifier 52. The amplified signal is supplied to the switching circuit 53 and input to the amplifier 60 of the booster 57. The signal is further amplified by the amplifier 60 and then transmitted from the antenna 61. Further, signals extracted from the input and output signals of the amplifier 60 are supplied to the automatic gain control circuit 62 and the amplification factor of the amplifier 60 is controlled such that the gain of the input signal/output signal of the amplifier 60 can be made constant.

Also, in this embodiment, since the gain control for each of the portable radiotelephone 50 and booster 57 is independently effected, the portable radiotelephone 50 can be connected to the booster 57 even if it is designed without considering that it will be connected to the booster 57.

Figure 12:
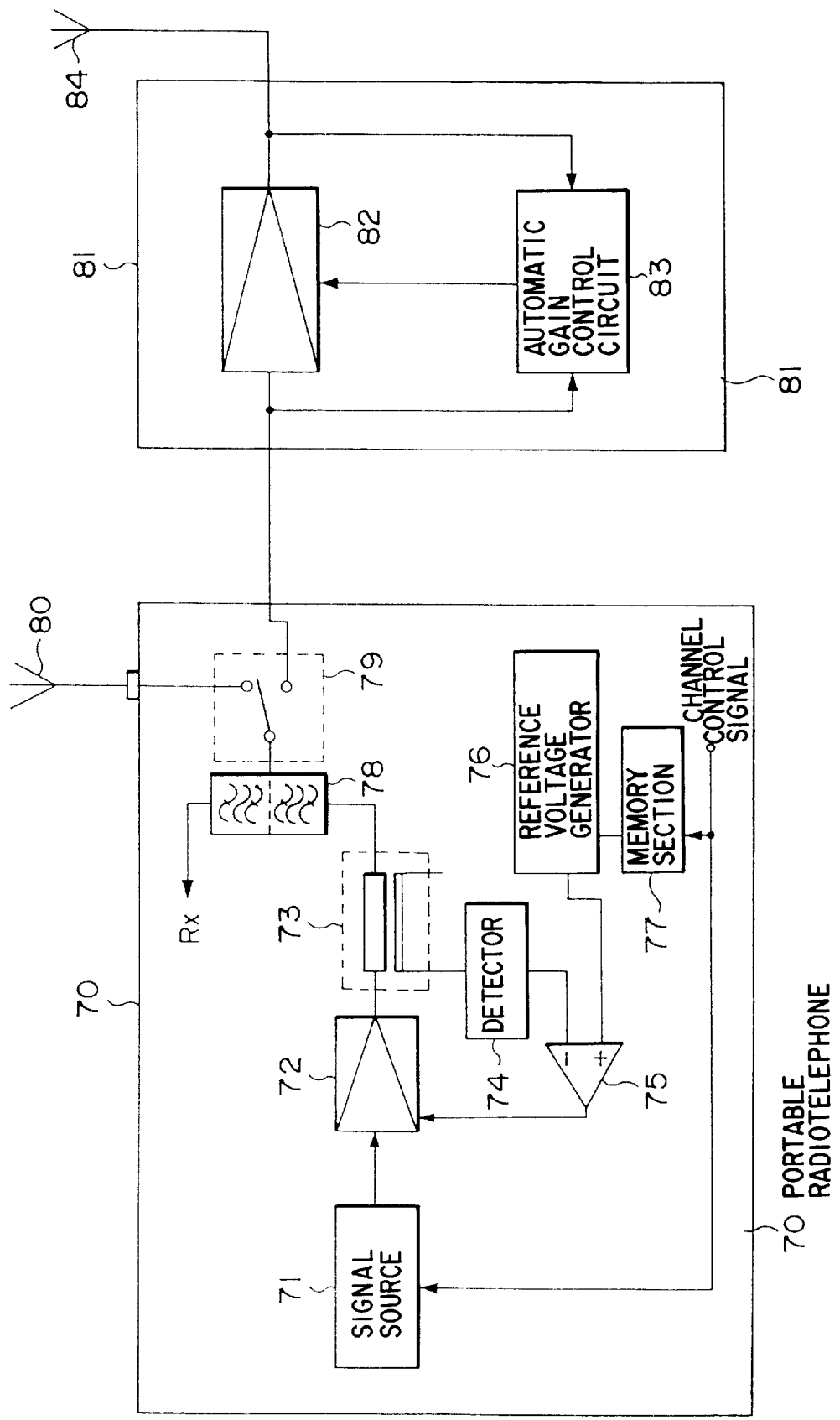
FIG. 12 is a block diagram showing a third embodiment of a portable radio telephone equipment according to this invention.
Figure 13A:
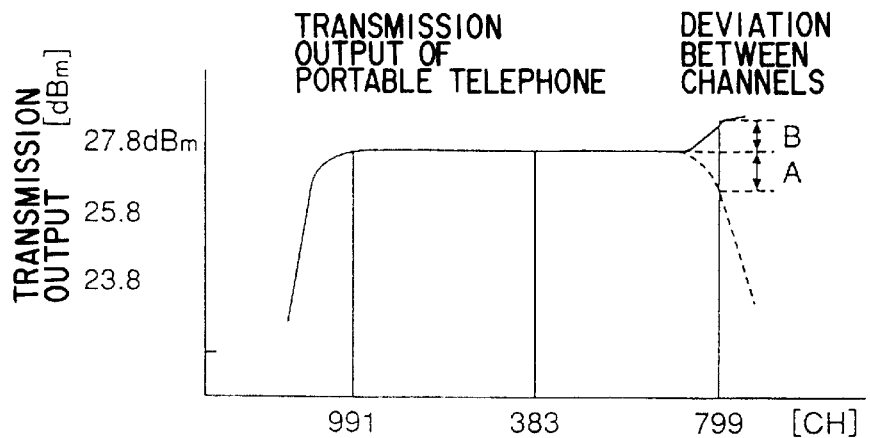
FIGS. 13A, 13B, and 13C are characteristic diagrams for illustrating the operation of the third embodiment.
Figure 13B:
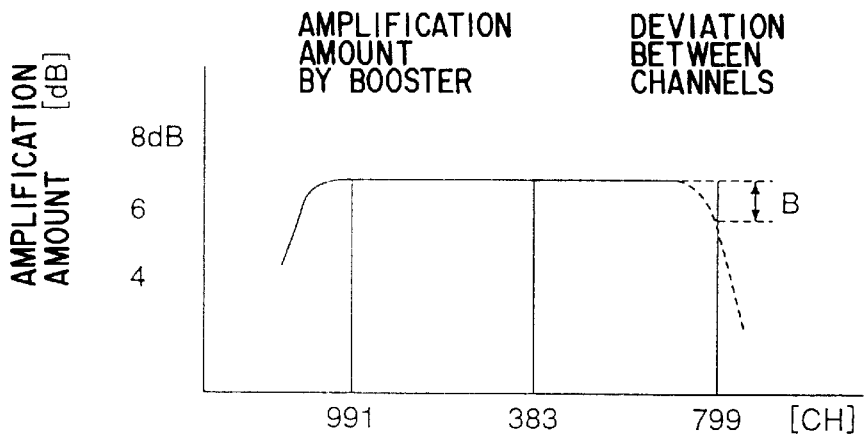
Figure 13C:
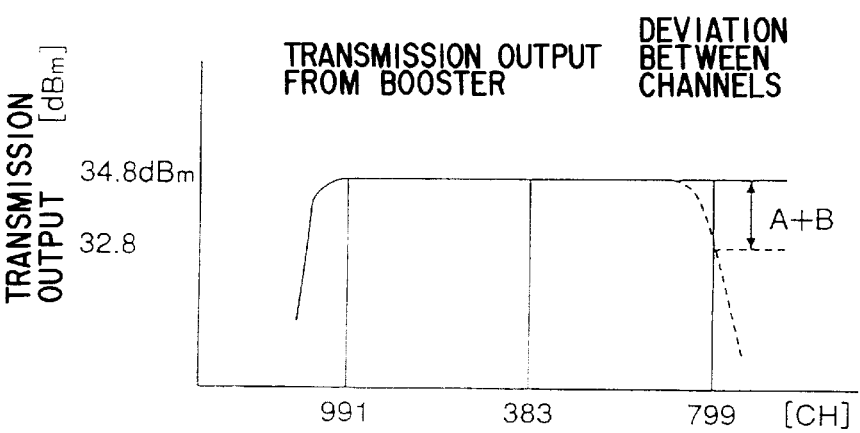

FIG. 12 is a diagram showing the construction of a radio telephone equipment according to a third embodiment of this invention. FIGS. 13A to 13C are diagrams showing the characteristic of the second embodiment.

Generally, the portable radio telephone equipment was constructed by a portable radiotelephone and a booster which simply amplified a transmission output thereof by a preset amount. Therefore, a deviation in the transmission output of the portable radiotelephone 50 between the channels caused a loss of A particularly on the high frequency side (channel 799 side) near the reception frequency according to the frequency characteristic of the antenna multiplexer as shown in FIG. 13A. The loss occurs on the low frequency side (channel 991 side), but since it is outside the application range of frequency band, it is not necessary to take it into consideration.

Further, a deviation in the amplification amount of the booster connected to the portable radiotelephone occurred between the channels as shown in FIG. 13B and caused a loss of B on the high frequency side (channel 799 side). As a result, a problem that a loss of (A+B) occurred on the high frequency side (channel 799 side) with respect to the central frequency (channel 383) as shown in FIG. 13C was provided in the conventional portable radio telephone equipment.

The third embodiment is made to compensate for the deviation between the channels, and a radio telephone equipment of this embodiment is constructed by a portable radiotelephone 70, booster 81 and external antenna 84 as shown in FIG. 12. The portable radiotelephone 70 is constructed by a signal source 71, amplifier 72, directional coupler 73, detector 74, comparator 75, reference voltage generator 76, memory section 77, antenna multiplexer 78, switching circuit 79, and antenna 80. The booster 81 is constructed by an amplifier 82 and automatic gain control circuit 83.

When the booster 81 is not used, the switching circuit 79 connects the output of the antenna multiplexer 78 with the antenna 80. The signal source 71 generates a control signal and speech signal to be transmitted. A signal generated from the signal source 71 is amplified by the amplifier 72. The amplified signal is partly extracted by the directional coupler 73 and part of the output thereof is input to the detector 74. In the detector 74, the input signal is detected and smoothed to extract a DC component from the input signal. A signal of the extracted DC component is supplied to the inverting input terminal of the comparator 75. A reference voltage generated from the reference voltage generator 76 based on a channel control signal supplied from a CPU (not shown) and information of the memory section 77 is supplied to the non-inverting input terminal of the comparator 75. The channel control signal changes the reference voltage according to the channel (frequency) for compensating for the loss A shown in FIG. 13A which is caused by differences in the amplification factor of the amplifier 72 in the radiotelephone 70 for the channels. The comparator 75 compares the voltages supplied to the two input terminals and controls the amplification factor of the amplifier 72 so as to set the transmission output of the amplifier 72 to a desired transmission output. Thus, the amplification factor of the amplifier 72 is controlled for each channel and the amplifier 72 always generates a constant transmission output. The transmission output is input to the antenna multiplexer 78 and then transmitted from the antenna 80 via the switching circuit 79 after an unnecessary signal is removed.

When the booster 81 is used, the switching circuit 79 connects the output of the antenna multiplexer 78 with the amplifier 82. With this connection, like the case wherein the booster 81 is not used, a transmission signal amplified by the amplifier 60 and output from the portable radiotelephone 70 is amplified by the amplifier 82. The signal amplified by the amplifier 82 is transmitted from the antenna 84. Further, signals extracted from the input and output signals of the amplifier 82 are supplied to the automatic gain control circuit 83 and the amplification factor of the amplifier 82 is controlled such that the gain of the input signal/output signal of the amplifier 82 can be made constant.

In the portable radiotelephone 70 of this embodiment, when the booster 81 is connected as shown in FIG. 13A. the amplification factor of the amplifier 72 is controlled to previously enhance the transmission output in which the amplifying amount of the booster 81 is small by B by previously taking the deviation B between the channels only of the booster 81 into consideration. Specifically, the CPU (not shown) of the portable radiotelephone 70 generates a channel control signal for changing the amplification factor of each channel to attain the transmission output characteristic as indicated by the solid line in FIG. 13A. The memory section 77 stores data of amplification factor corresponding to the channel control signal and controls the reference signal generator 76 according to the channel control signal. As a result, a power supply voltage of the amplifier 72 is controlled for each channel and the amplification factor is changed. Therefore, a deviation between the channels is eliminated as shown in FIG. 13C.

Figure 14:
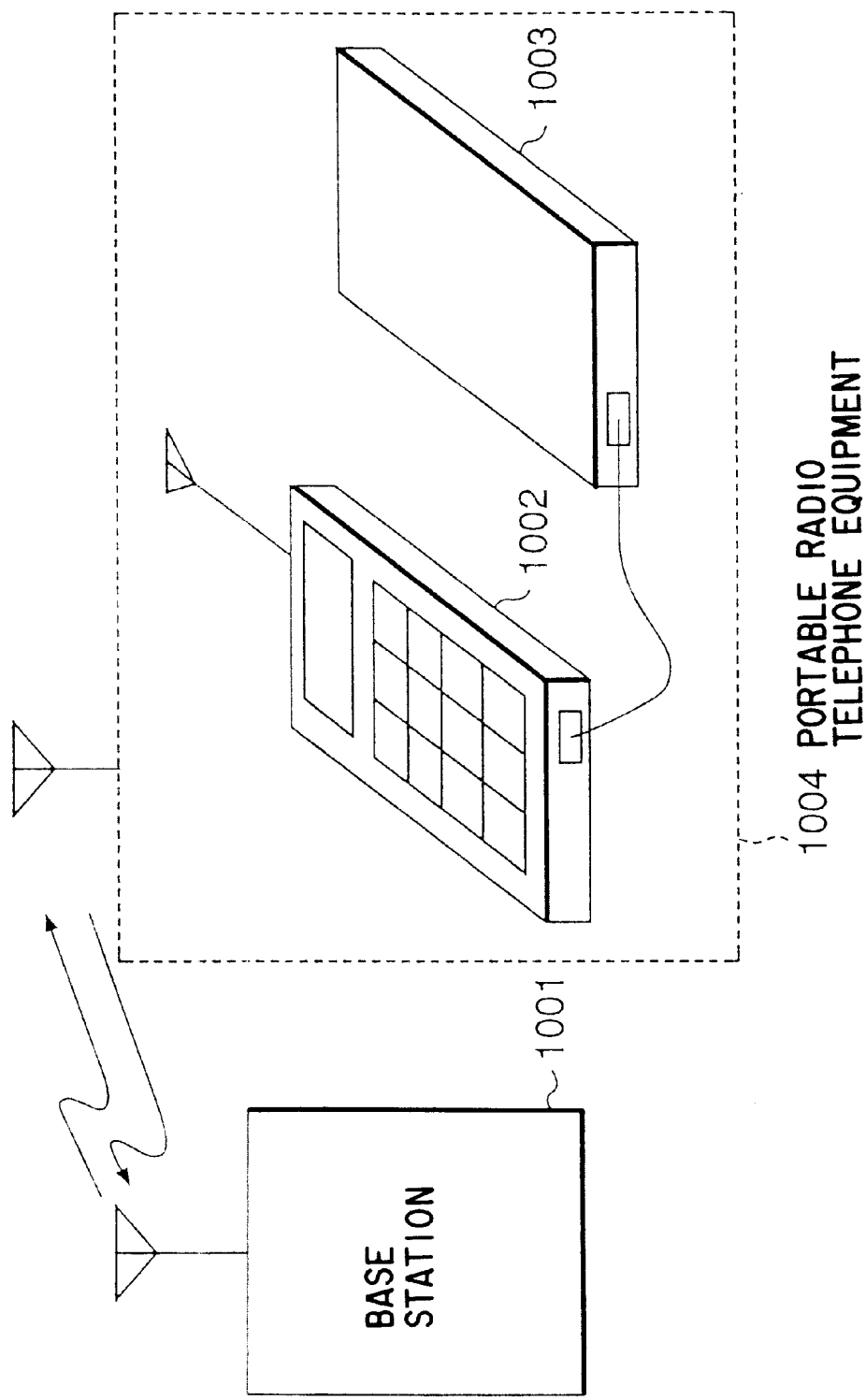
FIG. 14 is a block diagram showing a fourth embodiment of a portable radio telephone equipment according to this invention.

FIG. 14 is a diagram showing the whole system of a fourth embodiment. This system is constructed by a base station 1001, and a portable radio telephone equipment 1004 connected to the base station 1001 via a radio circuit. The portable radio telephone equipment 1004 is constructed by a portable radiotelephone 1002 and a booster 1003 for amplifying an output thereof. The portable radio telephone equipment 1004 may be constructed only by a portable radiotelephone 1002 in some cases.

Figure 15:
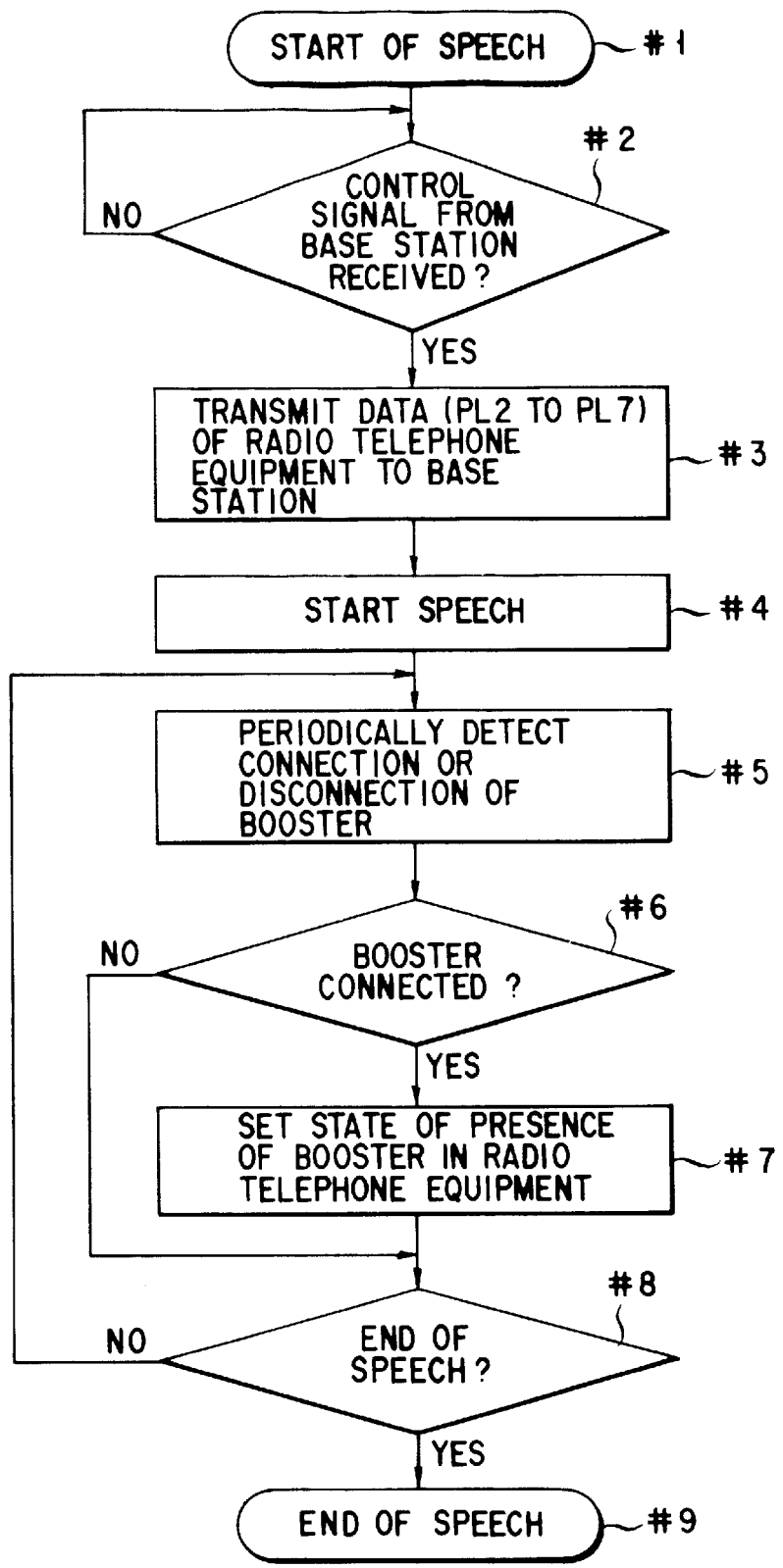
FIG. 15 is a flowchart for illustrating the operation of the conventional portable radiotelephone for comparison with the fourth embodiment.

FIG. 15 is a flowchart showing the operation of the conventional portable radiotelephone, and FIG. 16 is a flowchart showing the operation of the conventional base station.

First, the operation of the portable radiotelephone is explained with reference to FIG. 15. In this case, it is supposed that the portable radio telephone equipment is constructed only by a portable radiotelephone and the booster is not connected.

When speech is started in the step #1, the portable radio telephone equipment receives a control signal from the base station in the step #2. At this time, if the portable radio telephone equipment cannot receive the control signal, it waits in the step #2 until the control signal can be received. If the control signal is received, the portable radio telephone equipment transmits a transmission power level (PL2 to PL7) of Class III as data indicating that it is constructed only by a portable radiotelephone to the base station in the step #3. As a result, the speech state is set as shown in the step #4.

The portable radio telephone equipment periodically detects the connection or disconnection of the booster during the speech as shown in the steps #5, #6. At this time, if the portable radio telephone equipment detects that the booster is connected to the portable radiotelephone, it amplifies the transmission power level from the Class III to the transmission power level (PL0 to PL7) of Class I and sets the state of connection of the booster in the step #7. If the booster is not connected, the step #7 is skipped and the transmission power level (PL2 to PL7) of Class III is kept unchanged.

Next, the portable radio telephone equipment determines whether the speech is completed or not in the step #8, and if the speech is continued, it maintains the speech, and returns to the step #5, and if the speech is completed, it executes the speech terminating process in the step #9.

Next, the operation of the base station is explained with reference to the flowchart of FIG. 16. In this case, it is supposed that the portable radio telephone equipment is constructed only by a portable radiotelephone and the booster is not connected.

When speech is started in the step #11, the base station transmits a control signal to the portable radio telephone equipment in the step #12. After this, in the step #13, the base station receives a transmission power level (PL2 to PL7) of Class III as data supplied from the portable radio telephone equipment and indicating that the portable radio telephone equipment is constructed only by a portable radiotelephone. If the base station cannot receive a signal of the transmission power level, it repeatedly effects the steps #12, #13 until it can receive the signal. If the signal of the transmission power level is received, it sets the amplification factor of the portable radiotelephone equipment such that the portable radio telephone equipment can output a signal at the transmission power level (PL2 to PL7) of Class III in the step #14. Specifically, it sets a signal corresponding to the level control signal of FIG. 11 to Class III. As a result, as shown in the step #15, speech with the portable radio telephone equipment can be started.

Next, the base station determines whether the speech is completed or not in the step #16, and if the speech is continued, it maintains the speech, and if the speech is completed, it executes the speech terminating process in the step #17.

According to the above conventional system, the base station received a transmission power level (PL) as data indicating the state and type of the portable radio telephone equipment only when speech with the portable radio telephone equipment was started (step #12 in FIG. 16). Therefore, if the type of the portable radio telephone equipment was changed during the speech, for example, if the booster was connected and the transmission power level was changed, the base station could not get information of the changed transmission power level. Therefore, since the base station 1 could not detect the change of the output level or the like of the portable radio telephone equipment even if the booster was connected to the portable radio telephone equipment during the speech, transmission at the transmission power level amplified according to the regulation of Class could not be effected and speech effectively utilizing the booster function could not be attained.

Further, the portable radio telephone equipment has a VOX (Voice Operating Transmission) function that power of the radio section of the transmission system is supplied when a voice is input from the microphone, and some portable radio telephone equipment transmits ON/OFF data as well as data indicating the state and type of the portable radio telephone equipment only when the speech is started by use of the above function.

Figure 17:
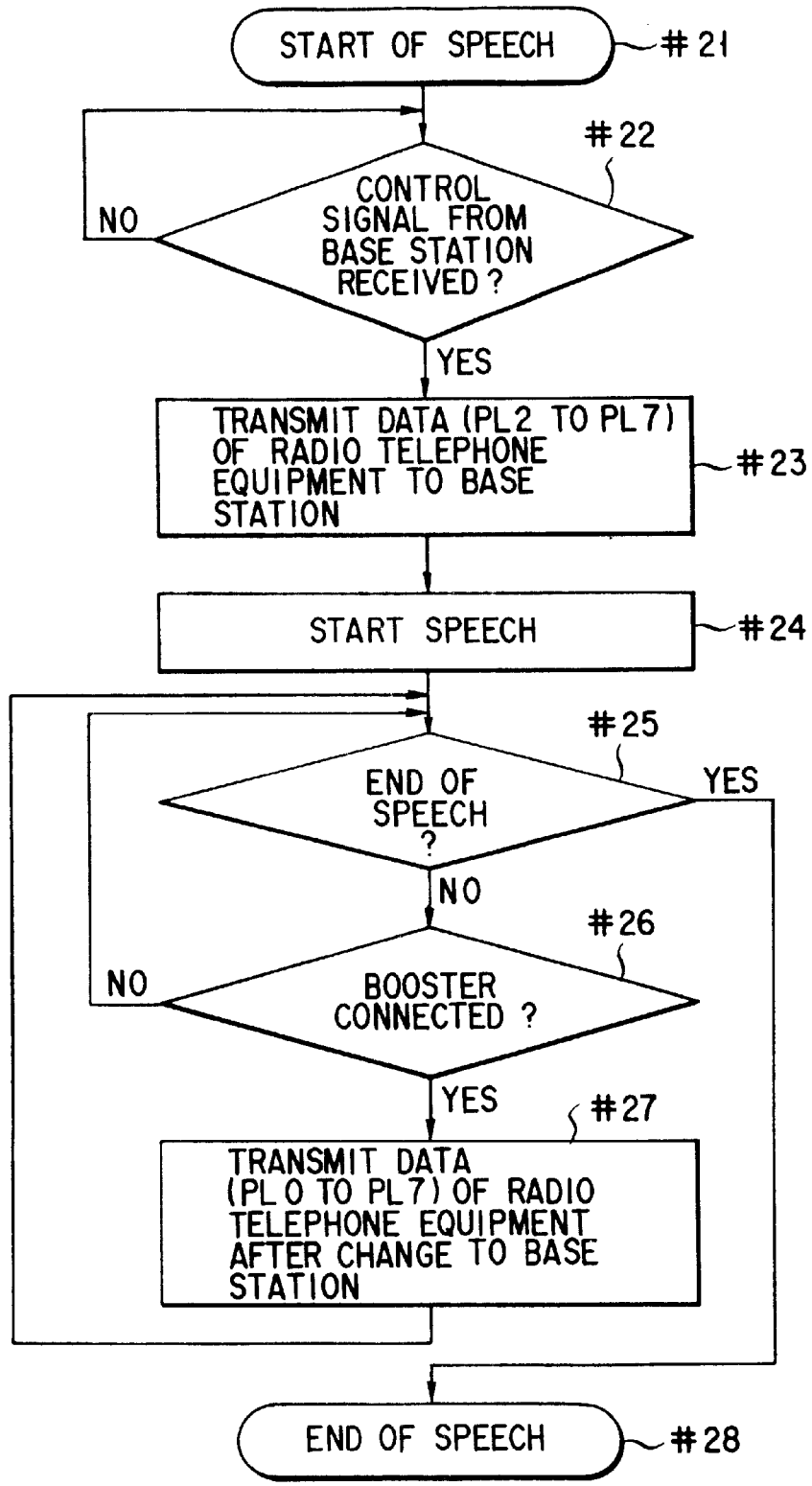
FIG. 17 is a flowchart for illustrating the operation of the portable radiotelephone of the fourth embodiment.

Therefore, in order to solve the above problem, in this embodiment, the portable radio telephone equipment 1004 is operated as shown in FIG. 17 and the base station 1001 is operated as shown in FIG. 18.

First, the operation of the portable radio telephone equipment 1004 is explained with reference to FIG. 17. Also, in this case, it is supposed that the portable radio telephone equipment 1004 is constructed only by the portable radiotelephone 1002 and the booster 1003 is not connected.

When speech is started in the step #21, the portable radio telephone equipment 1004 receives a control signal from the base station in the step #22. At this time, if the portable radio telephone equipment 1004 cannot receive the control signal, it waits in the step #22 until the control signal can be received. If the control signal is received, the portable radio telephone equipment 1004 transmits a transmission power level (PL2 to PL7) of Class III as data indicating that it is constructed only by a portable radiotelephone to the base station 1001 in the step #23. As a result, the speech state is set as shown in the step #24.

The portable radio telephone equipment 1004 determines whether the speech is completed or not in the step #25, and if the speech is continued, the portable radio telephone equipment 1004 detects the connection or disconnection of the booster during the speech as shown in the steps #26. At this time, if the portable radio telephone equipment 1004 detects that the booster 1003 is connected to the portable radiotelephone 1002, it transmits a transmission power level (PL0 to PL7) of Class I indicating the transmission power level after the change to the base station 1001 in the step #27, and then the process is returned to the step #25. If it is detected in the step #26 that the booster 1003 is not connected, the process is returned to the step #25. If it is detected in the step #25 that the speech is completed, the speech terminating process is effected in the step #28.

Next, the operation of the base station 1001 is explained with reference to the flowchart of FIG. 18. Also, in this case, it is supposed that the portable radio telephone equipment 1004 is constructed only by a portable radiotelephone 1002 and the booster 1003 is not connected.

When speech is started in the step #31, the base station transmits a control signal to the portable radio telephone equipment 1004 in the step #32. After this, in the step #33, the base station 1001 receives a transmission power level (PL2 to PL7) of Class III as data supplied from the portable radio telephone equipment 1004 and indicating that the portable radio telephone equipment is constructed only by a portable radiotelephone. If the base station 1001 cannot receive a signal of the transmission power level, it repeatedly effects the steps #32, #33 until it can receive the signal. If the signal of the transmission power level is received, it sets the portable radiotelephone equipment 1004 such that the portable radio telephone equipment 1004 can output a signal at the transmission power level (PL2 to PL7) of Class III in the step #34. As a result, as shown in the step #35, speech with the portable radio telephone equipment 1004 can be started.

Next, the base station 1001 determines in the step #36 whether the transmission power level of the portable radiotelephone equipment 1004 is changed or not. If the change is detected, it sets the portable radiotelephone equipment 1004 in the step #37 such that the portable radiotelephone equipment 1004 can output a transmission power level signal (in this case, PL0 to PL7 of Class I) after the change. If the change is not detected, whether the speech is completed or not is determined in the step #38, and if the speech is continued, the process is returned to the step of detecting that the change of the transmission power level is made or not in the step #36. If completion of the speech is detected in the step #38, it executes the speech terminating process in the step #39.

According to this embodiment, in a case wherein data of the transmission power level of the portable radiotelephone equipment 1004 set at the time of starting of the speech is changed during the speech by connection of the booster, transmission can be made with the transmission power after the change by causing the portable radiotelephone equipment 1004 to transmit data after the change again. Therefore, the portable radiotelephone equipment 1004 can permit speech effectively utilizing the booster function. The change of the state of the portable radiotelephone equipment 1004 is not limited to the change of the transmission power level by connection of the booster, and ON/OFF of the VOX function is changed during the speech in some cases.

This invention is not limited to the above embodiments and can be variously modified. For example, as a modification of the booster in the above embodiment, examples shown in FIGS. 19 to 22 can be considered.

Figure 19:
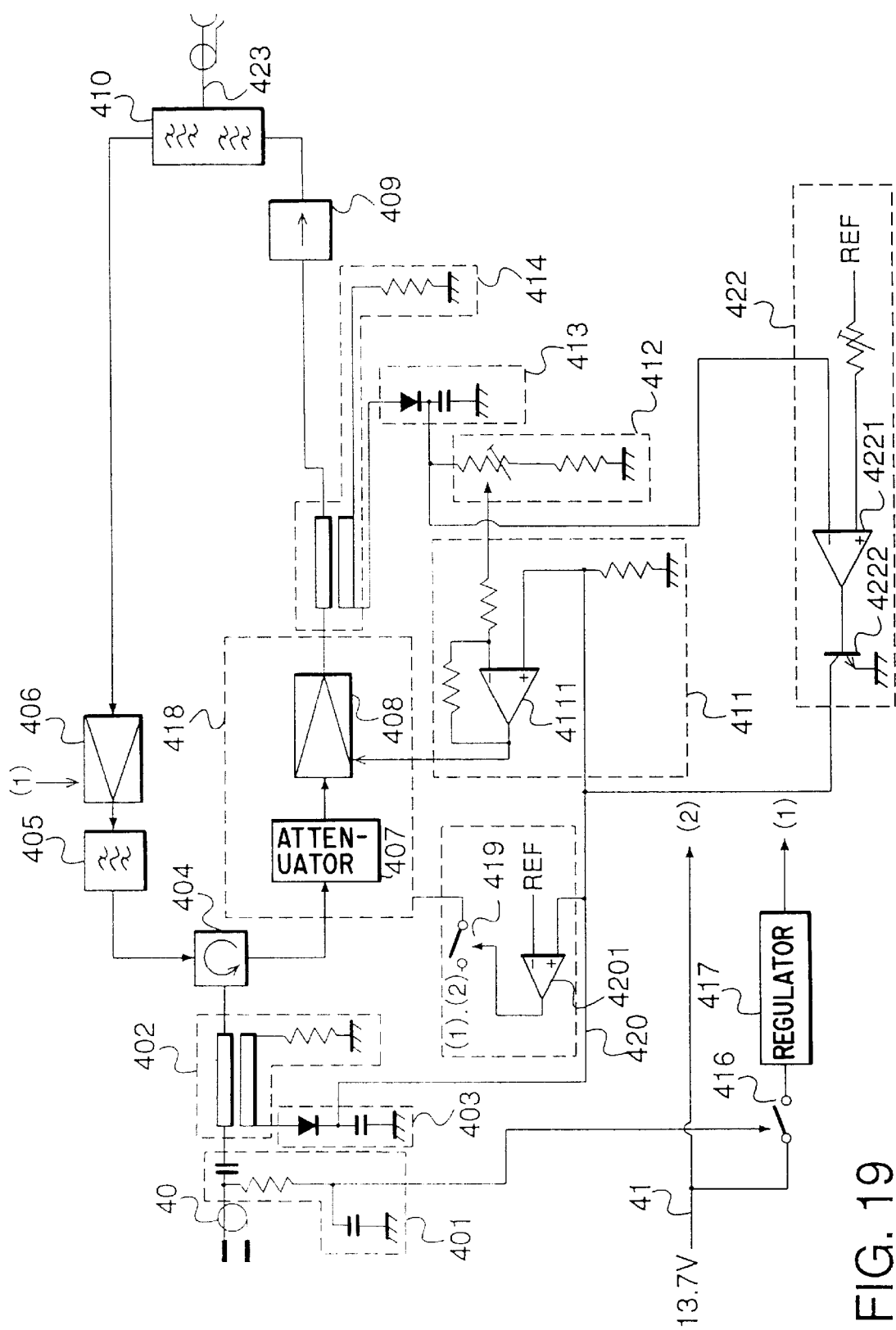
FIG. 19 is a circuit diagram showing a first modification of the booster.

FIG. 19 shows a first modification. It is different from the booster shown in FIG. 14 in that a directional coupler 1100 is connected between the transmission power amplifier 408 and the isolator 409 and the output thereof is input to the detector circuit 413.

According to this embodiment, the gain of the whole booster can be set without taking the frequency characteristic of the attenuation amount of a signal in the antenna multiplexer 410 into consideration.

Figure 20:
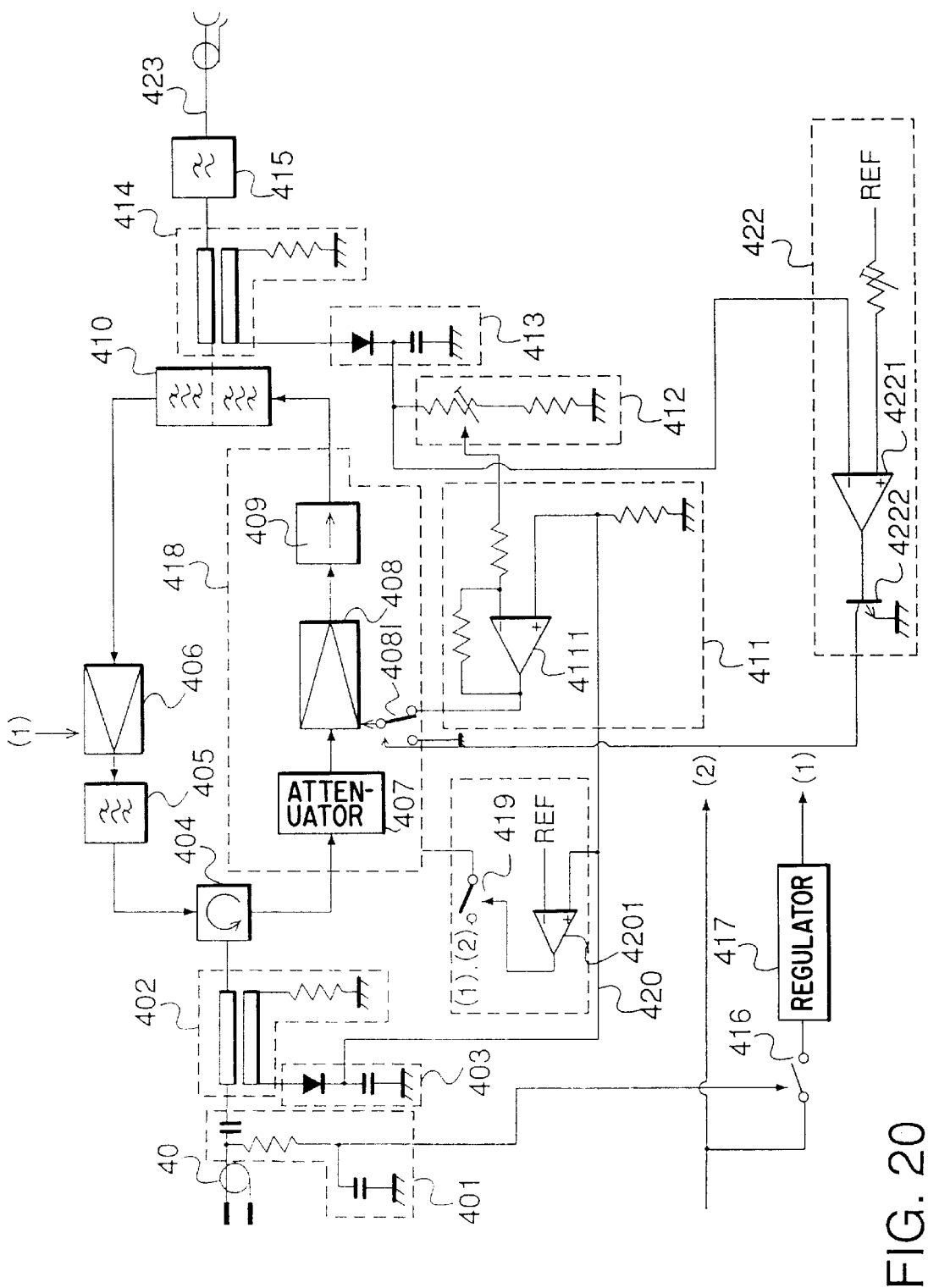
FIG. 20 is a circuit diagram showing a second modification of the booster.

FIG. 20 shows a second modification. In the embodiment shown in FIG. 4, when the booster is connected to the radio telephone equipment which previously has a transmission ability higher than the upper limit of transmission power defined by the regulation, transmission with the power higher than the upper limit is inhibited by interrupting supply of power to the transmitting section 418, but in this embodiment, transmission with the power higher than the upper limit of transmission power defined by the regulation is inhibited by interrupting supply of power not to the whole portion of the transmitting section 418 but only to the transmission amplifier 408.

Figure 21:
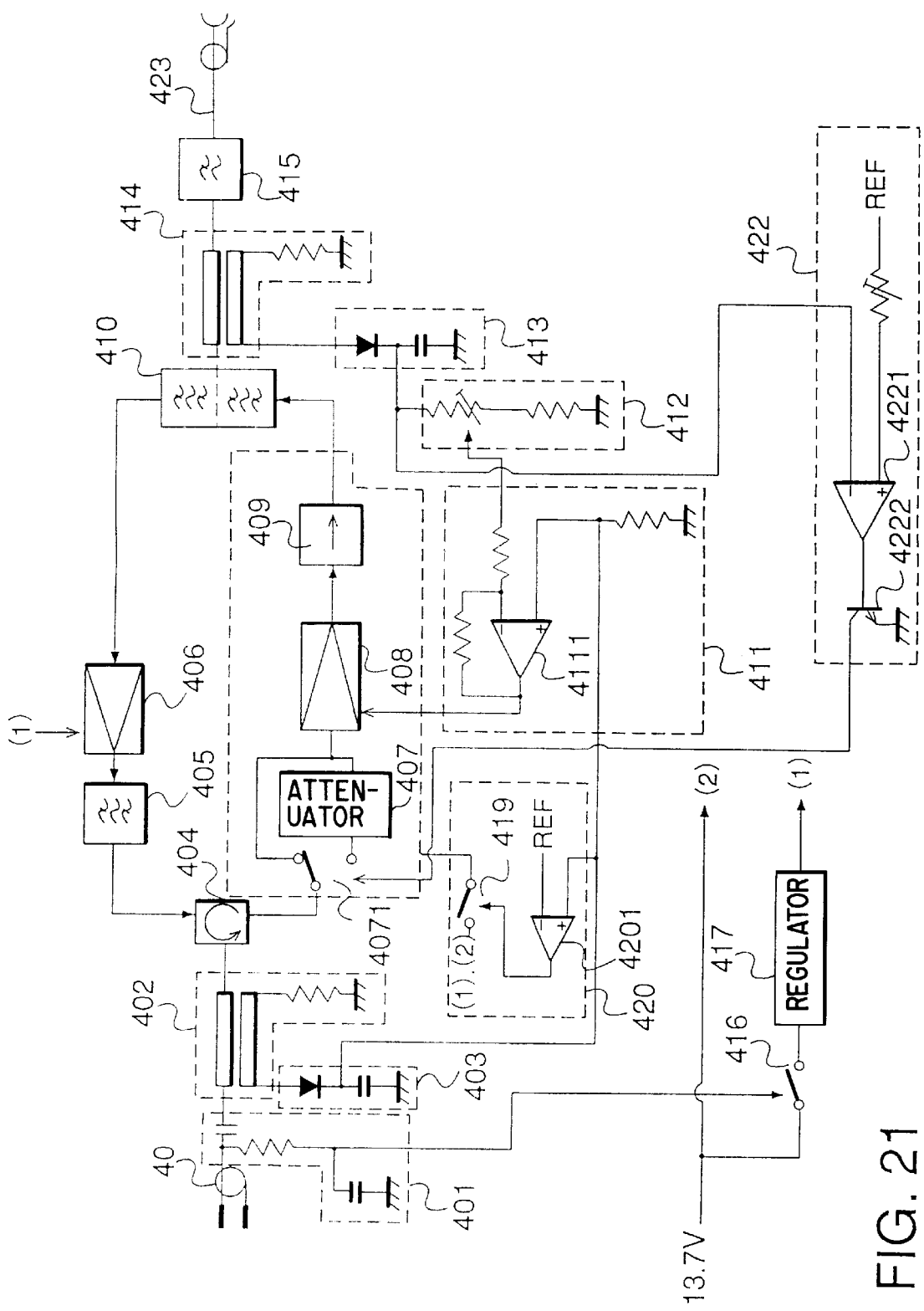
FIG. 21 is a circuit diagram showing a third modification of the booster.

FIG. 21 shows a third modification. In this embodiment, a transmission signal is input to the directional coupler 414 via the transmitting section 418 to which power is supplied. The directional coupler 414 supplies part of the transmission signal to the detector circuit 413.

The detector circuit 413 outputs a voltage value corresponding to the detected signal from the input signal. The voltage value is input to the non-inverting input terminal of the comparator 4221 in the 3W power limiting circuit 422 and compared with a 3W reference voltage REF input to the inverting input terminal. An output signal of the comparator 4211 is supplied to the gate terminal of the transistor 4222. As a result, when the voltage value of the detected signal is higher than the 3W reference voltage (when it can be determined that the transmission power is equal to or higher than 3W), the transistor 4222 is turned ON. This causes the switch 4071 to be switched on the attenuator 407 side, and the level of a signal supplied to the transmission power amplifier 408 is lowered and transmission with the power higher than the upper limit of transmission power defined by the regulation can be inhibited.

On the other hand, when the voltage value of the detected signal is lower than the 3W reference voltage, the transistor 4222 is turned OFF, the switch 4071 is switched on the transmission power amplifier 408 side, and the transmission signal is supplied to the transmission power amplifier 408 with the level thereof kept unchanged.

Figure 22:
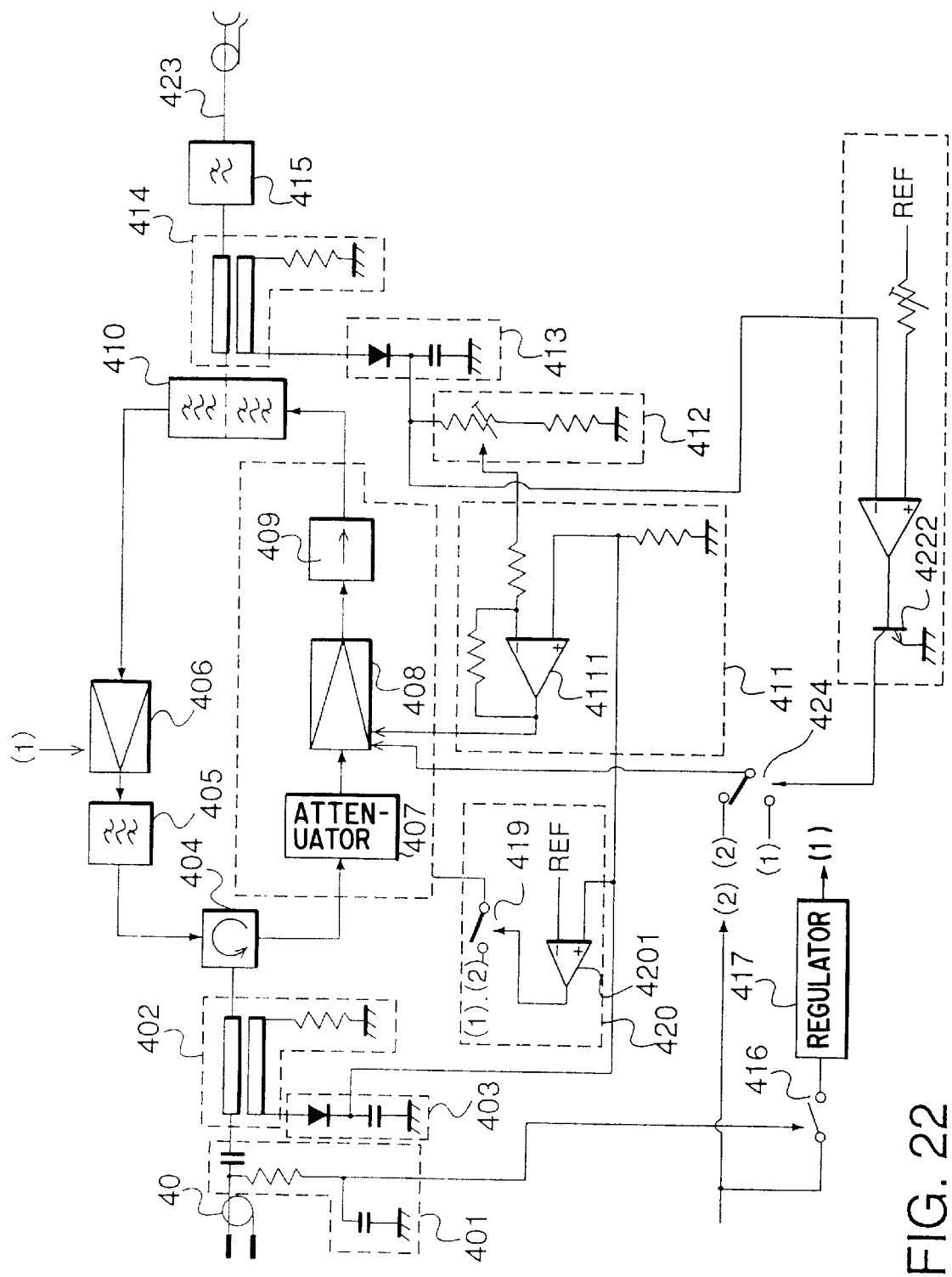
FIG. 22 is a circuit diagram showing a fourth modification of the booster.

FIG. 22 shows a fourth modification. In this embodiment, a transmission signal is input to the directional coupler 414 via the transmitting section 418 to which power is supplied. The directional coupler 414 supplies part of the transmission signal to the detector circuit 413.

The detector circuit 413 outputs a voltage value corresponding to the detected signal from the input signal. The voltage value is input to the noninverting input terminal of the comparator 4221 in the 3W power limiting circuit 422 and compared with a 3W reference voltage REF input to the inverting input terminal. An output signal of the comparator 4211 is supplied to the gate terminal of the transistor 4222. As a result, when the voltage value of the detected signal is higher than the 3W reference voltage (when it can be determined that the transmission power is equal to or higher than 3W), the transistor 4222 is turned ON. This causes the switch 424 to be switched to the terminal (1) on the 8 V regulator 417 side, and the amplification factor of the transmission power amplifier 408 is set to a lower level and transmission with the power higher than the upper limit of transmission power defined by the regulation can be inhibited.

On the other hand, when the voltage value of the detected signal is lower than the 3W reference voltage, the transistor 4222 is turned OFF, the switch 424 is switched on the 13.7 V car battery line (2) side, and the transmission signal is amplified.

Further, the above explanation is made for the embodiments applied to the car telephone equipment, but this invention is not limited to the above embodiments and can be applied to general radio telephone equipments irrespective of whether they are portable type or not.

Industrial Applicability

As described above, according to the portable radio telephone equipment according to this invention, the portable radiotelephone controls the output level according to the level control signal supplied from the base station, the booster has an amplifier for amplifying an output of the portable radiotelephone by a preset amount, and the amplification factor of the amplifier is controlled to keep the gain of the booster (the gain of the output of the amplifier in the booster with respect to the output of the portable radiotelephone) constant. Therefore, since the portable radiotelephone and the booster can be independently controlled, the booster can be connected to any type of portable radiotelephone.

Further, the portable radiotelephone has a circuit for detecting the input level in the booster and turns ON/OFF the power supply of the transmission circuit section by determining the presence or absence of a transmission signal based on the level of the input signal. Therefore, since power can be supplied only when the transmission signal is present, the power consumption can be adequately reduced.

Further, the portable radiotelephone has a circuit for detecting the output level in the booster, and determines occurrence of erroneous connection and limits the output or turns OFF the power supply when the transmission power is equal to or higher than a preset value. Therefore, a power outside the predetermined power range will not be output even when a portable radiotelephone which already has a transmission ability of the upper limit of the transmission power defined by the regulation is connected to the booster.

Further, when the booster is connected to the portable radiotelephone, the transmission power of a channel in which the amplification amount of the booster is small is previously enhanced by taking a deviation between the channels only in the booster into consideration. Therefore, a booster having a small deviation between the channels can be provided.

Further, when connection of the portable radiotelephone to the booster is detected, a transmission signal with the level of level 2 to level 8 is output and it is amplified to the level of level 1 to level 7 in the booster and then output. Therefore, the conventional control circuit for changing the reference signal of the automatic gain control circuit in the booster according to the level control signal from the portable radiotelephone becomes unnecessary and the number of parts can be reduced.

Further, when data indicating the state and type of the radio telephone equipment is changed during the speech, data after the change is transmitted to the base station so that the base station can get the data. Therefore, the circuit control corresponding to the state on the radio telephone equipment side can be attained.

We claim:

1. A radio telephone equipment which communicates with a base station via a radio channel and comprises a radiotelephone and a booster removably connected to said radiotelephone, wherein said radiotelephone comprises:

an antenna for transmitting a signal;

first amplifying means for amplifying a speech signal to be transmitted;

first automatic gain control means for controlling an amplification factor of said first amplifying means according to an output level of said first amplifying means and a control signal transmitted from the base station. the control signal compensating for a frequency-dependent, signal-level deviation in a transmission signal output from said radiotelephone;

switching means for selectively supplying an output signal of said first amplifying means to said antenna or said booster;

means for storing correction data for compensating for a frequency-dependent, signal-level deviation in a transmission signal output from said booster;

means for detecting connection of said booster; and means for correcting the control signal supplied to said first automatic gain control means according to the correction data when connection of said booster is detected by said detecting means; and wherein said booster comprises:

second amplifying means for amplifying a signal supplied from said radiotelephone; and second automatic gain control means for controlling an amplification factor of said second amplifying means according to an input level of said second amplifying means and an output level of said second amplifying means.

2. A radio telephone equipment according to claim 1, wherein said second automatic gain control means comprises means for controlling the amplification factor of said second amplifying means to keep gain of said booster constant according to the input level of said second amplifying means and the output level of said second amplifying means.

3. A radio telephone equipment according to claim 1, wherein said booster comprises a directional coupler connected to said second amplifying means, for extracting a signal input to said second amplifying means and a signal output from said second amplifying means and supplying the same to said automatic gain control means.

4. A radio telephone equipment according to claim 1, wherein said booster and said radiotelephone are connected via a high-frequency cable for transmitting a high-frequency signal;

said booster superposes a DC signal on the high-frequency signal and supplies the signal to said radiotelephone via said high-frequency cable; and said detecting means detects connection of said booster based on the DC signal superposed on the high-frequency signal.

5. A radio telephone equipment according to claim 1, wherein said radiotelephone comprises a portable handset and an adapter having a speaker and microphone for permitting handsfree conversation, said booster being connected to said adapter.

6. A radio telephone equipment according to claim 1, wherein the radio telephone equipment is a car telephone.

7. A radio telephone equipment according to claim 1, wherein the radio telephone equipment is a portable radiotelephone.

8. A radio telephone equipment which comprises a radiotelephone and a booster removably connected to said radiotelephone and which communicates with a base station via a radio channel, wherein said radiotelephone comprises:

an antenna for transmitting a signal;

first amplifying means for amplifying a speech signal to be transmitted;

means for inputting a frequency specifying signal;

first automatic gain control means for controlling an amplification factor of said first amplifying means according to the frequency specifying signal in order to compensate for a frequency-dependent, signal-level deviation in a transmission signal from the radiotelephone;

switching means for selectively supplying an output signal of said first amplifying means to said antenna or said booster;

means for storing correction data of each frequency for compensating for a frequency-dependent, signal-level deviation in a transmission signal output from said booster;

means for correcting the output level of said radiotelephone according to the correction data read out from said storing means based on the frequency specifying signal when connection of said booster is detected by said detecting means; and wherein said booster comprises:

second amplifying means for amplifying a signal supplied from said radiotelephone; and second automatic gain control means for controlling an amplification factor of said second amplifying means according to an input level of said second amplifying means and an output level of said second amplifying means.

9. A radio telephone equipment according to claim 8, wherein said booster and said radiotelephone are connected via a high-frequency cable for transmitting a high-frequency signal;

said booster superposes a DC signal on the high-frequency signal and supplies the signal to said radiotelephone via said high-frequency cable; and said detecting means detects connection of said booster based on the DC signal superposed on the high-frequency signal.

10. A radio telephone equipment which communicates with a base station via a radio channel and includes a radiotelephone and a booster which is removably connected to said radiotelephone and amplifies an output of said radiotelephone by a constant amount, said radiotelephone equipment comprising:

an antenna for transmitting a signal;

first amplifying means for amplifying a speech signal to be transmitted;

first automatic gain control means for controlling an amplification factor of said first amplifying means according to an output level of said first amplifying means and a control signal transmitted from the base station, the control signal compensating for a frequency-dependent signal-level deviation in a transmission signal output from said radiotelephone:

switching means for selectively supplying an output signal of said first amplifying means to said antenna or said booster;

means for storing correction data for compensating for a frequency-dependent, signal-level deviation in a transmission signal output from said booster;

means for detecting connection of said booster;

means for correcting the control signal supplied to said first automatic pain control means according to the correction data when connection of said booster is detected by said detecting means;

and means for attenuating an output of said radiotelephone when connection of said booster is detected.

11. A radio telephone equipment according to claim 10, wherein said radiotelephone comprises means for controlling a transmission level according to a control signal from the base station; and wherein said attenuating means comprises means for attenuating the output of said radiotelephone by correcting the control signal supplied to said radiotelephone from the base station.

12. A radio telephone equipment according to claim 10, wherein said booster comprises;

second amplifying means for amplifying a signal supplied from said first amplifying means; and second automatic gain control means for controlling an amplification factor of said second amplifying means according to an input level of said second amplifying means, and an output level of said second amplifying means.

13. A radio telephone equipment according to claim 12, wherein said second automatic gain control means comprises means for controlling the amplification factor of said second amplifying means to keep gain of said booster constant according to an input level of said second amplifying means and an output level of said second amplifying means.

14. A radio telephone equipment according to claim 12, wherein said booster comprises;

a first directional coupler connected to an input of said second amplifying means for extracting a signal input to said second amplifying means and supplying the same to said second automatic gain control means; and a second directional coupler connected to an output of said second amplifying means for extracting a signal output from said second amplifying means and supplying the same to said second automatic gain control means.

15. A radio telephone equipment according to claim 10, wherein said radiotelephone includes a portable handset and an adapter having a speaker and microphone for permitting handsfree conversation said booster being connected to said adapter.

16. A radio telephone equipment according to claim 10, wherein the radio telephone equipment is a car telephone.

17. A radio telephone equipment according to claim 10, wherein the radio telephone equipment is a portable radiotelephone.

18. A radio telephone equipment which communicates with a base station via a radio channel and comprises a radiotelephone and a booster removably connected to said radiotelephone for amplifying an output of said radiotelephone by a constant amount, wherein said radio telephone comprises:

means for detecting whether said booster is connected;

means for attenuating an output of said radiotelephone when connection of said booster is detected;

an antenna for transmitting a signal;

first amplifying means for amplifying a speech signal to be transmitted;

first automatic gain control means for controlling an amplification factor of said first amplifying means according to an output level of said first amplifying means and a control signal transmitted from the base station in order to compensate for a frequency-dependent, signal-level deviation in a transmission signal output from said radiotelephone; and switching means for selectively supplying an output signal of said first amplifying means to said antenna or said booster; and wherein said booster comprises:

second amplifying means for amplifying a signal supplied from said radiotelephone; and second automatic gain control means for controlling an amplification factor of said second amplifying means according to an input level of said second amplifying means and an output level of said second amplifying means; and wherein said radio telephone further comprises:

means for storing correction data for reducing a frequency-dependent, signal-level deviation in a transmission signal output from said booster; and means for correcting the output level of said radiotelephone according to the correction data when connection of said booster is detected.

19. A radio telephone equipment according to claim 18, wherein said booster and said radiotelephone are connected via a high-frequency cable for transmitting a high-frequency signal;

said booster superposes a DC signal on the high-frequency signal and supplies the signal to said radiotelephone via said high-frequency cable; and said detecting means detects connection of said booster based on the DC signal superposed on the high-frequency signal.

20. A radio telephone equipment which comprises a radiotelephone and a booster removably connected to said radiotelephone and which communicates with a base station via a radio channel, wherein said radiotelephone comprises:

means for generating a control signal and speech signal to be transmitted;

an antenna for transmitting a signal;

first amplifying means for amplifying a signal generated from said generating means;

first automatic gain control means for controlling an amplification factor of said first amplifying means according to an output level of said first amplifying means and a control signal from the base station;

switching means for selectively supplying an output signal of said first amplifying means to said antenna or said booster;

means for storing amplification factors corresponding to a plurality of channels;

means for recognizing one of the plurality of channels over which a signal is transmitted;

means for detecting connection of said booster; and means for correcting the control signal supplied to said first automatic gain control means to control the output level of said radiotelephone according to an amplification factor stored in said storing means and corresponding to the one of the plurality of channels recognized by said recognizing means when connection of said booster is detected by said detecting means, and wherein said booster comprises:
second amplifying means for amplifying the output signal supplied from said first amplifying means; and
second automatic gain control means for controlling an amplification factor of said second amplifying means according to an input level of said second amplifying means and an output level of said second amplifying means.

21. A radio telephone equipment which comprises a radiotelephone and a booster removably connected to said radiotelephone and which communicates with a base station via a radio channel, wherein said radiotelephone comprises:

means for generating a control signal and speech signal to be transmitted;

an antenna for transmitting a signal;

first amplifying means for amplifying a signal generated from said generating means;

means for inputting a channel specifying signal;

first automatic gain control means for controlling an amplification factor of said first amplifying means according to the channel specifying signal;

switching means for selectively supplying an output signal of said first amplifying means to said antenna or said booster;

means for storing amplification factors corresponding to a plurality of channels;

means for recognizing one of the plurality of channels over which a signal is transmitted;

means for detecting connection of said booster;

means for correcting the control signal supplied to said first automatic gain control means to control the output level of said radiotelephone according to an amplification factor stored in said storing means and corresponding to the one of the plurality of channels recognized by said recognizing means when connection of said booster is detected by said detecting means; and wherein said booster comprises:

second amplifying means for amplifying a signal supplied from said first amplifying means; and second automatic gain control means for controlling an amplification factor of said second amplifying means according to an input level of said second amplifying means and an output level of said second amplifying means.

22. A radio telephone equipment which communicates with a base station via a radio channel and includes a radiotelephone and a booster which is removably connected to said radiotelephone and amplifies an output of said radiotelephone by a constant amount, said radio telephone equipment comprising:

an antenna for transmitting a signal;

first amplifying means for amplifying a speech signal to be transmitted;

means for inputting a frequency specifying signal;

first automatic gain control means for controlling an amplification factor of said first amplifying means according to the frequency specifying signal in order to compensate for a frequency-dependent, signal-level deviation in a transmission signal from the radiotelephone;

switching means for selectively supplying an output signal of said first amplifying means to said antenna or said booster;

means for storing correction data of each frequency for compensating for a frequency-dependent, signal-level deviation in a transmission signal output from said booster;

means for correcting the output level of said radiotelephone according to the correction data read out from said storing means based on the frequency specifying signal when connection of said booster is detected by said detecting means;

means for detecting whether the booster is connected to said radiotelephone; and means for attenuating an output of said radiotelephone when connection of said booster is detected.

23. A radio telephone equipment according to claim 22, in which said booster comprises:

means for amplifying a transmission signal output from the radiotelephone;

means for determining the presence or absence of the transmission signal based on the level of an input signal of said amplifying means; and means for supplying electric power to said amplifying means only when said determining means determines that the transmission signal is present.

24. A radio telephone equipment which communicates with a base station via a radio channel and includes a radiotelephone and a booster which is removably connected to said radiotelephone and amplifies an output of said radiotelephone by a constant amount, said radio telephone equipment comprising:

means for generating a control signal and speech signal to be transmitted;

an antenna for transmitting a signal;

first amplifying means for amplifying a signal generated from said generating means;

means for inputting a channel specifying signal;

first automatic gain control means for controlling the amplification factor of said first amplifying means according to the channel specifying signal;

switching means for selectively supplying an output signal of said first amplifying means to an antenna of said radiotelephone or said booster;

means for storing amplification factors corresponding to a plurality of channels;

means for recognizing one of the plurality of channels over which a signal is transmitted;

means for correcting the control signal supplied to said first automatic gain control means to control the output level of said radiotelephone according to an amplification factor stored in said storing means and corresponding to the one of the plurality of channels recognized by said recognizing means when connection of said booster is detected by said detecting means;

means for detecting whdther the booster is connected to said radiotelephone; and means for attenuating an output of said radiotelephone when connection of said booster is detected.

25. A radio telephone equipment according to claim 24, in which said booster comprises:

means for amplifying a transmission signal output from the radiotelephone;

means for determining the presence or absence of the transmission signal based on the level of an input signal of said amplifying means; and means for supplying electric power to said amplifying means only when said determining means determines that the transmission signal is present.

* * * * *